(12) United States Patent
Henderson et al.

(10) Patent No.: US 7,180,990 B1
(45) Date of Patent: Feb. 20, 2007

(54) PREPAID TELEPHONE CALLING CARD WITH MESSAGE RECORDING CAPABILITY

(75) Inventors: Karl M. Henderson, Highland Village, TX (US); James D. Bond, Allen, TX (US); Stacy Borocz, Roswell, GA (US); Anne Gillman, Marietta, GA (US); Kamran W. Mir, Plano, TX (US)

(73) Assignee: MCI, LLC, Basking Ridge, NJ (US)

( * ) Notice: Subject to any disclaimer, the term of this patent is extended or adjusted under 35 U.S.C. 154(b) by 1112 days.

(21) Appl. No.: 09/321,387

(22) Filed: May 27, 1999

(51) Int. Cl.
*H04M 15/00* (2006.01)
*H04M 1/64* (2006.01)
*H04M 11/00* (2006.01)

(52) U.S. Cl. ............... 379/114.2; 379/67.1; 379/88.18; 379/88.22; 379/88.23

(58) Field of Classification Search .............. 379/144, 379/114, 67.1, 120, 88.04, 88.12, 88.18, 88.22, 379/88.23, 88.26, 114.2, 114.19, 114.05, 379/114.18, 114.16, 114.15
See application file for complete search history.

(56) References Cited

U.S. PATENT DOCUMENTS

| | | |
|---|---|---|
| 1,699,865 A | 1/1929 | Walton |
| 3,176,836 A | 4/1965 | Gunn |
| 3,647,056 A | 3/1972 | Jacobson et al. |
| 3,652,795 A | 3/1972 | Wolf et al. |
| 3,958,690 A | 5/1976 | Gee, Sr. |
| 4,439,636 A | 3/1984 | Newkirk et al. |
| 4,587,379 A | 5/1986 | Masuda |
| 4,706,275 A | 11/1987 | Kamil |
| 4,776,000 A | 10/1988 | Parienti |
| 4,777,646 A | 10/1988 | Harris |
| 4,799,255 A | 1/1989 | Billinger et al. |
| 4,853,952 A | 8/1989 | Jachmann et al. |
| 4,877,947 A | 10/1989 | Mori |
| 4,879,794 A | 11/1989 | Djerf |
| 4,935,956 A | 6/1990 | Hellwarth et al. |
| 4,951,308 A | 8/1990 | Bishop et al. |
| 4,964,156 A | 10/1990 | Blair |
| 5,003,584 A | 3/1991 | Benyacar et al. |

(Continued)

FOREIGN PATENT DOCUMENTS

| | | |
|---|---|---|
| EP | 0406841 | 1/1991 |
| FR | 2575016 | 12/1984 |

(Continued)

OTHER PUBLICATIONS

Carr, G., "Voice Processing Applications for the Central Office", Telephone Engineer & Management, Mar. 1, 1989.
Dunogue et al., "The Building of Intelligent Networks: Architecture & Systems from Alcatel", Alcatel CIT, No. 2, 1989, pp. 5–15.

*Primary Examiner*—Binh K. Tieu

(57) ABSTRACT

System and method for recording at least one message to be associated with a prepaid telephone calling card. The system and method include and involve a data storage system for storing data corresponding to the prepaid telephone calling card and at least one message. Also included and involved is a prepaid telephone calling card processing system that is coupled to the data storage system and configured to receive a request to record the message(s) during a service setup call over a telephone network and to cause the message(s) to be recorded for subsequent playback. The prepaid telephone calling card processing system may also be configured to receive a request to play the message(s) stored in relation to the prepaid telephone calling card during an access call over the telephone network and to cause the message(s) to be played back automatically.

10 Claims, 21 Drawing Sheets

U.S. PATENT DOCUMENTS

| | | | |
|---|---|---|---|
| 5,023,868 A | | 6/1991 | Davidson et al. |
| 5,036,533 A | | 7/1991 | Carter et al. |
| 5,068,891 A | | 11/1991 | Marshall |
| 5,086,457 A | | 2/1992 | Barraud et al. |
| 5,101,098 A | | 3/1992 | Naito |
| 5,109,405 A | | 4/1992 | Morganstein |
| 5,146,067 A | | 9/1992 | Sloan et al. |
| 5,155,342 A | | 10/1992 | Urano |
| 5,163,086 A | | 11/1992 | Ahearn et al. |
| 5,192,947 A | | 3/1993 | Neustein |
| 5,193,110 A | | 3/1993 | Jones et al. |
| 5,204,894 A | | 4/1993 | Darden |
| 5,222,120 A | | 6/1993 | McLeod et al. |
| 5,222,125 A | | 6/1993 | Creswell et al. |
| 5,224,600 A | | 7/1993 | Neugebauer |
| 5,225,666 A | | 7/1993 | Amarena et al. |
| 5,226,073 A | | 7/1993 | Albal et al. |
| 5,241,586 A | | 8/1993 | Wilson et al. |
| 5,251,251 A | * | 10/1993 | Barber et al. ............... 379/67.1 |
| 5,264,689 A | | 11/1993 | Maes et al. |
| 5,266,782 A | | 11/1993 | Alanara et al. |
| 5,266,785 A | | 11/1993 | Sugihara et al. |
| 5,327,482 A | | 7/1994 | Yamamoto |
| 5,333,180 A | | 7/1994 | Brown et al. ............ 379/88.06 |
| 5,352,876 A | | 10/1994 | Watanabe et al. |
| 5,359,182 A | | 10/1994 | Schilling |
| 5,359,642 A | | 10/1994 | Castro |
| 5,375,161 A | | 12/1994 | Fuller et al. |
| 5,408,519 A | | 4/1995 | Pierce et al. |
| 5,409,092 A | | 4/1995 | Itako et al. |
| 5,440,621 A | | 8/1995 | Castro |
| 5,450,477 A | | 9/1995 | Amarant et al. |
| 5,477,038 A | | 12/1995 | Levine et al. |
| 5,487,107 A | * | 1/1996 | Atkins et al. ............... 379/144 |
| 5,504,808 A | | 4/1996 | Hamrick, Jr. |
| 5,511,114 A | | 4/1996 | Stimson et al. |
| 5,513,117 A | | 4/1996 | Small |
| 5,577,109 A | | 11/1996 | Stimson |
| 5,588,037 A | | 12/1996 | Fuller et al. |
| 5,592,537 A | * | 1/1997 | Moen ......................... 379/144 |
| 5,610,970 A | | 3/1997 | Fuller et al. |
| 5,621,787 A | | 4/1997 | McKoy et al. |
| 5,652,795 A | | 7/1997 | Dillon et al. |
| 5,655,006 A | * | 8/1997 | Cox, Jr. et al. ............ 379/67.1 |
| 5,661,781 A | * | 8/1997 | DeJager ...................... 379/144 |
| 5,719,926 A | * | 2/1998 | Hill ........................ 379/115.02 |
| 5,721,768 A | | 2/1998 | Stimson et al. |
| 5,740,229 A | * | 4/1998 | Hanson et al. ............... 379/144 |
| 5,740,915 A | | 4/1998 | Williams |
| D394,387 S | | 5/1998 | Williams |
| 5,790,636 A | | 8/1998 | Marshall |
| 5,806,677 A | | 9/1998 | Storti |
| 5,815,561 A | | 9/1998 | Nguyen et al. |
| 5,825,863 A | * | 10/1998 | Walker ....................... 379/144 |
| 5,828,732 A | * | 10/1998 | Gow .......................... 379/144 |
| 5,828,740 A | | 10/1998 | Khuc et al. |
| 5,854,975 A | | 12/1998 | Fougnies et al. |
| 5,859,897 A | | 1/1999 | Furman et al. |
| 5,864,604 A | | 1/1999 | Moen et al. |
| 5,864,606 A | * | 1/1999 | Hanson et al. ............... 379/144 |
| 5,901,284 A | | 5/1999 | Hamdy-Swink |
| 5,903,636 A | | 5/1999 | Malik |
| 5,909,486 A | | 6/1999 | Walker et al. |
| 5,912,956 A | * | 6/1999 | Longo et al. ................ 379/144 |
| 5,923,734 A | * | 7/1999 | Taskett ...................... 379/144 |
| 5,963,626 A | * | 10/1999 | Nabkel ....................... 379/142 |
| 5,978,452 A | | 11/1999 | Cho |
| 5,991,380 A | | 11/1999 | Bruno et al. |
| 6,009,150 A | * | 12/1999 | Kamel ...................... 379/88.22 |
| 6,222,915 B1 | * | 4/2001 | Mueller et al. ......... 379/114.15 |
| 6,418,202 B1 | * | 7/2002 | Caldwell et al. ......... 379/88.25 |

FOREIGN PATENT DOCUMENTS

| | | |
|---|---|---|
| FR | 2575061 | 12/1984 |
| GB | 2151061 | 7/1985 |
| GB | 2215897 | 9/1989 |
| JP | 62-054623 | 3/1987 |
| JP | 62-266960 | 11/1987 |
| JP | 63-220649 | 9/1988 |
| JP | 2-061786 | 3/1990 |
| JP | 2-079193 | 3/1990 |
| JP | 2-245893 | 10/1990 |
| JP | 3-024684 | 2/1991 |
| JP | 3-062269 | 3/1991 |
| JP | 4-001891 | 1/1992 |
| JP | 4-043493 | 2/1992 |
| JP | 4-140896 | 5/1992 |
| JP | 4-354092 | 12/1992 |
| JP | 6-121075 | 4/1994 |
| WO | 90/15495 | 12/1990 |

* cited by examiner

PREPAID TELEPHONE CALLING CARD WITH MESSAGE RECORDING CAPABILITY

BACKGROUND OF THE INVENTION

The present invention relates to systems and methods that are used to facilitate enhanced services related to prepaid telephone calling cards.

It is well known that prepaid telephone calling cards (hereinafter "prepaid cards") have become widely used to obtain telephone calling services such as long distance calling services, etc. For example, consumers can purchase prepaid cards from retail stores and use the same to obtain access to telephone services to call friends and family all over the world. As such, many different kinds of prepaid telephone calling cards are now available. Consumers can purchase prepaid telephone calling cards having a variety of calling options (domestic calling options, international calling options, etc.) and a wide selection of prepaid values. For example, consumers can purchase domestic-use calling cards that are charged with 100 domestic call units (i.e., a unit is typically equal to one telephone service minute, but may be associated with some other amount of time—e.g., 50 seconds, etc.).

The appeal of prepaid cards to consumers is due in large part to the fact that prepaid telephone calling cards often allow consumers to realize savings associated with making telephone calls. For example, prepaid telephone calling cards often allow consumers to avoid the costs associated with using a conventional telephone calling card that is associated with a particular telephone line (e.g., an access call service charge that is added to other toll-call rates and charges). As a result of their appeal, many retailers have begun to offer and sell prepaid cards. Since a relatively large selection of prepaid telephone calling cards can be stocked and displayed without requiring significant retail floor space, retailers can enjoy maximized revenues relative to small sections of their leased or owned storefronts.

Despite the appeal of prepaid cards to both users and retailers, such market acceptance has created serious problems for providers of prepaid cards and related telephone services. In particular, providers of prepaid cards have been forced to distinguish their products in order to effectively compete. To date, the only effective way to distinguish one's prepaid cards has been to continuously lower telephone service rates to the point of extremely thin and, sometimes, negative margins. And, unfortunately, prepaid cards that promise the "lowest" telephone service rates often are not sufficient to capture and retain prepaid card customers.

Thus, there exists a need to provide systems and methods that will allow providers of prepaid cards to offer enhanced services in relation to their prepaid cards without requiring providers to lower their telephone service rates to unreasonable levels. To be viable, such systems and methods must allow users of prepaid cards to easily take advantage of such enhanced services while, at the same time, using prepaid cards to obtain conventional telephone calling services.

SUMMARY OF THE INVENTION

The present invention solves the above-described problems associated with prior prepaid telephone calling cards by providing systems and methods that facilitate the provisioning, processing, and use of enhanced services and features. By providing such systems and methods, providers of prepaid telephone calling cards will be able to effectively compete in the prepaid card marketplace by offering better, more feature-rich services on which consumers will come to enjoy and rely. In particular, such systems and methods may be used to provide enhanced services to card users who wish to pre-record messages to be associated with prepaid telephone calling cards. For example, such a message may be played back automatically to another card user during an access call made in relation to a prepaid telephone calling card.

To achieve the stated benefits associated with the novel features of the present invention, provided is a system and a method for recording at least one message to be associated with a prepaid telephone calling card. The system and method include and involve a data storage system for storing data corresponding to a prepaid telephone calling card and at least one message. Also included and involved is a prepaid telephone calling card processing system that is coupled to the data storage system and which is configured to receive a request to record the message(s) during a service setup call over a telephone network and to cause the message(s) to be recorded for subsequent playback. The prepaid telephone calling card processing system may also be configured to receive a request to play the message(s) stored in relation to the prepaid telephone calling card during an access call over the telephone network and to cause the message(s) to be played back automatically. According to, another aspect of the present invention, provided is a method of using a prepaid telephone calling card that includes the steps of accessing a prepaid telephone calling card processing system during a prepaid telephone calling card service setup call via a telephone network, entering a card identifier corresponding to data addressable by the prepaid telephone calling card processing system, and recording at least one message during the service setup call. The message(s) are addressable by the prepaid telephone calling card processing system during a subsequent telephone service access or message retrieval telephone call.

According to another aspect of the present invention, provided is a method for facilitating the use of a prepaid telephone calling card that includes the steps of storing data corresponding to a prepaid telephone calling card and to at least one message related to the prepaid telephone calling card, receiving a request to automatically play at least one message stored in relation to the prepaid telephone calling card during an access call over a telephone network, and causing at least one message to be played during the access or other message retrieval type telephone call.

BRIEF DESCRIPTION OF THE DRAWINGS

The present invention is described in detail below with reference to the following drawing figures, of which:

FIG. 3I is a continuation call flow diagram of the call flow diagram started in FIGS. 3A–3H;

FIG. 3O is the conclusion of the call flow diagram started in FIGS. 3A–3N.

DETAILED DESCRIPTION

The present invention is concerned with providing systems and methods that may be used to provide enhanced prepaid telephone calling card services and features. Such enhanced services and features include and involve systems and methods that are provided by the present invention to deliver prepaid telephone calling cards (hereinafter "prepaid cards") having message recording capabilities. With such enhanced prepaid cards and related services, people will be able to pre-record and play-back personal messages such as list messages (e.g., Christmas wish list messages, etc.) intended for particular recipients. That is, the present invention will allow data stored in relation to a particular prepaid card to include or point to prerecorded messages that may be played back to a card user at a later time (e.g., during an access call related to a prepaid card, etc.). As such, the present invention will allow a user (e.g., a child) of a prepaid card ("card user") to record at least one message (e.g., "Please get me a toy truck", etc.) which may be heard by another card user (e.g., a parent) who will hear the prerecorded message when he accesses a prepaid card processing system. As such, the present invention provides a new prepaid card that may be purchased and given to recipients as gifts and the like.

To facilitate the provisioning of a prepaid card that is to have a message recording capability, the present invention includes two phases of operation that are discussed in detail below with regard to FIGS. 1, 2A–2E, and 3A–3FF. A first phase involves prepaid card activation and feature/service setup, while a second phase includes card use. The first phase, prepaid card activation and feature setup, involves the actions of a seller of prepaid cards in conjunction with the actions of a service provider who is responsible for managing systems to support prepaid card use. Prepaid card feature/server setup involves the actions of a card user who, by way of the present invention, is now able to initiate a setup call to a prepaid card processing system to pre-record at least one message to be associated with a particular prepaid card and which may be intended for a particular recipient (e.g., a particular card user).

The aforementioned second phase, card use, may involve the actions of another party (e.g., another card user such as a parent) who seeks to retrieve earlier pre-recorded message(s) stored in relation to the prepaid card. A card user, now may hear another card user's pre-recorded message(s) upon use of the prepaid card. For example, the pre-recorded message(s) may be a message recorded by a first card user (e.g., a child) during the aforementioned card setup call via a telephone network. Also, the pre-recorded message(s) may be played any number of times (e.g., one or more times) upon use of the prepaid card by the card user such as during a message retrieval call, etc.

Figure 1:
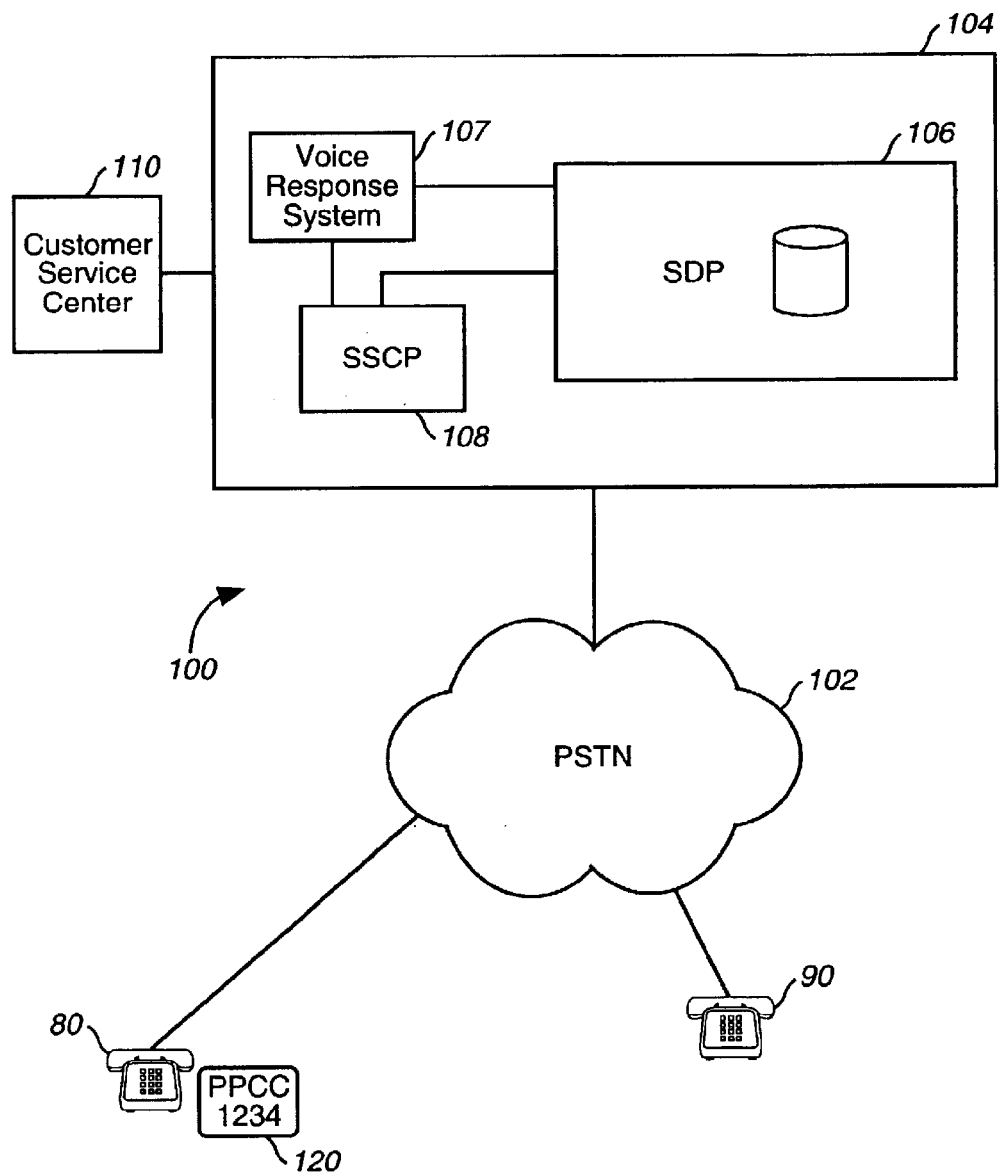
FIG. 1 is a diagram of a system in which enhanced services may be provided in conjunction with prepaid calling cards according to a preferred embodiment of the present invention.

To deliver the aforementioned enhanced services/features and, in particular, the ability to record and playback messages associated with prepaid cards, the present invention utilizes systems and corresponding processes which are now described. In particular, the structural aspects of the present invention are described with reference to FIG. 1. Depicted in FIG. 1 is a system that supports enhanced prepaid cards, such as those that may be set up to have associated pre-recorded messages. In particular, system 100 includes a calling party 80 (e.g., having telephone number 301-993-1234), a called party 90 (e.g., having telephone number 972-918-1244), the publicly switched telephone network (PSTN) 102, a prepaid telephone calling card processing system 104 having at least one intelligent network platform having one or more service data points (SDP) 106 or other type of database server system or facility, at least one service switching point (SSP) and service control point (SCP) which may be implemented as one or more service switching control points (SSCP) 108, the functionality of which may be dispersed among multiple systems or components, and a customer service center 110 which may be attended by live operators. In FIG. 1, calling party (e.g., a card purchaser, card user, etc.) may use a prepaid card 120 to obtain enhanced prepaid telephone calling card services in accordance with the present invention (e.g., telephone call and pre-recorded message services).

Also included within prepaid telephone calling card processing system 104 is a voice response system 107 that may be used to automatically receive voice prompts and/or recorded messages via a telephone call (e.g., a setup call during which at least one message may be recorded, an access call during which such message(s) may be played back automatically) over a telephone network such as the PSTN 102. The use of such voice response systems will be readily apparent and understood by those skilled in the art. It should also be noted that the voice response system 107 may be configured to actually store message content (e.g., digital data, etc.) related to a pre-recorded message to be associated with prepaid card 120. That is, voice response system 107 may include and/or operate with a voice data storage system (e.g., one similar or like a voice mail storage system) to record messages associated with prepaid cards (e.g., a message may be stored in a manner similar or like a voice mail message, etc.). The ultimate voicing of messages from one card user to another may be voiced over a telephone call connection initiated by a card user via the voice response system 107 in response to appropriate instructions from SSCP 108, and in relation to message data addressable thereby (e.g., stored within a data storage facility or system). The use of a voice response system to facilitate voicing of digitally recorded voice sequences will be readily understood by those skilled in the art.

System 100 facilitates both card setup by a first card purchaser and card use by another card user. A prepaid card like prepaid card 120 may be used to obtain long-distance telephone service or other services that may be offered in conjunction with a prepaid type card (e.g., prepaid Internet service, prepaid cellular telephone service, etc.).

As noted above, prepaid telephone calling card processing system 104 is one that includes at least one intelligent network platform having, among other things, the SSCP 108 and the SDP 106. As such, user of the prepaid card 120 may access the SSCP 108 via the PSTN 102 to affect database records related to prepaid card 120. In particular, a card user (e.g., a child etc.) may setup prepaid card 120 by recording one or more messages, such as Christmas wish list messages, to be played back automatically upon later use of prepaid card 120 by another card user (e.g., a parent). Data related to prepaid card 120 may be stored in SDP 106. Such data may include card usage data such as remaining minutes, unit billing rates, and message information related to at least one message that may be stored in relation to prepaid card 120 and played, for example, during use of prepaid card 120 by a card user. Such message information may include digitally recorded message content data and pointer data, such as file names corresponding to message content stored in a particular, corresponding file that point to digitally recorded message data within storage facilities.

The user (e.g., a child, etc.) of prepaid card 120 may cause data related to prepaid card 120 to be affected via a live operator session handled through customer service center 110. The facilities to support use of a customer service call center, ultimately to support prepaid cards in accordance with the present invention, will be readily apparent to those skilled in the art.

Once prepaid card 120 has been setup (e.g., caused to be associated with at least one recorded message to be played back later), a card user may place a prepaid telephone calling card call in a conventional way by dialing a 1-800 access number and entering an appropriate PIN/CARD ID number to obtain long distance telephone service. In accordance with the present invention, a pre-recorded message (e.g., one pre-recorded by a child, etc) may be played automatically via the prepaid telephone calling card processing system 104 to another card user prior to completing an outbound long distance call, other telephone call, or other service request. Such a personal greeting may be one from a child such as "SANTA, PLEASE GIVE ME A PUPPY FOR CHRISTMAS," which may be retrieved later by a parent. Accordingly, the present invention facilitates a "SANTA'S HELPER" type prepaid card that will allow a child to call a 1-800 number to leave a wish list message for SANTA, which message may be retrieved later by a parent during an access call, message retrieval call, etc. Alternatively, a special message retrieval call may be provided wherein a card user may call into the prepaid telephone calling card processing system 104, such as via a special toll free access number to specifically retrieve earlier recorded messages such as those recorded as Christmas wish list messages from one's child, etc.

A telephone call desired by a calling party (e.g., by a card user) may be placed from a calling party station, such as one having telephone number 301-993-1234 to a called party having a telephone terminal station identified at telephone number 972-918-1244.

It should be understood that the structures illustrated in FIG. 1 are merely exemplary and are not meant to limit the present invention. For example, such structures may be geographically dispersed so that a database server system or facility implemented via the SDP 106 may be distributed across multiple geographic regions, systems, and data processing facilities. Those skilled in the art will understand that various other computing and data processing systems, components, facilities, and processes may be substituted and/or added to the system shown in FIG. 1 to provide and/or enhance the capabilities provided thereby.

The structural aspects of the present invention as described above and shown in FIG. 1, are designed to operate together to facilitate the phases of operation that were discussed in the OVERVIEW section hereof. In particular, the structures depicted in FIG. 1 that make up the system 100 are configured to support both prepaid card activation and set-up as a first phase of operation and card use as a second phase of operation in accordance with the present invention. Prepaid card activation involves the operations related to data stored for the prepaid card 120 that may be stored in the SDP 106. Such activation operations, include but are not limited to, card activation, deactivation, re-charge of remaining minutes, and point-of-sale activation intended to place the prepaid card 120 into an active, ready-for use state. Prepaid card activation may occur via a point-of-sale operation, a telephone session with a live operator, etc. An exemplary system to provide for activation operations related to prepaid calling cards is shown and described in co-pending U.S. patent application Ser. No. 09/089,815, filed on Jun. 4, 1998 and titled "POINT OF SALE ACTIVATION AND DEACTIVATION OF PREPAID TELEPHONE CALLING CARDS," which is commonly assigned and incorporated herein by reference. The systems and call flows illustrated within the aforementioned, co-pending U.S. patent application may be used to activate and deactivate (and otherwise affect data stored within SDP 106) to render the prepaid card 120 ready-for-use (e.g., make the prepaid card 120 ready for initiation of outbound telephone calls) by a card user. Such activation systems and call flows may be used to ready a card for use by a card user in accordance with the present invention.

After a card has been activated as described above, the card may be setup in accordance with the present invention. In particular, a prepaid card may be setup by causing at least one message (e.g., a Christmas wish list message) to be recorded in relation to data stored for the prepaid card 120. Upon use in accordance with a use phase related to the present invention, such pre-recorded message(s) may be played or voiced automatically to a card user (e.g., a parent, etc.).

The operations and call flows within the system 100 are illustrated in FIGS. 2A–2E. Such operations are self-explanatory, but are discussed herein to further illustrate the novel aspects of the operations that may occur within the present invention to facilitate a prepaid card having a message recording capability.

Figure 2A:
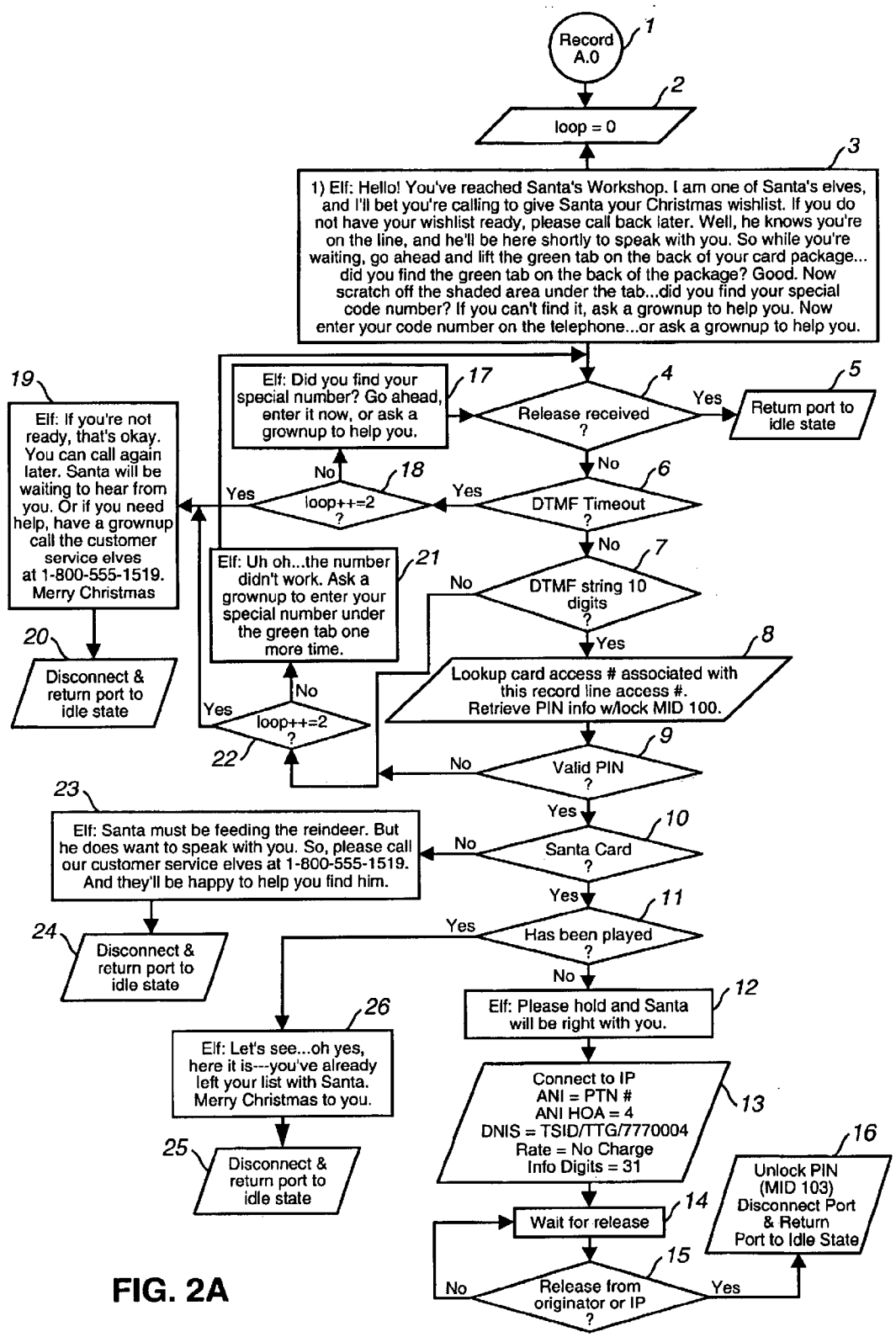
FIG. 2A is a call flow diagram that illustrates prepaid telephone calling card set-up operations in accordance with a preferred embodiment of the present invention.

Referring now to FIG. 2A, depicted therein is a prepaid card setup call flow, and, in particular, one that supports the recordation of a message(s) via a sequence that may be performed by a first card user (e.g., a child) for later play back to another card user (e.g., a parent). In FIG. 2A, a card purchaser or other calling party accesses a prepaid telephone calling card processing system via a telephone call (e.g., a setup call) through a network such as the PSTN 102 through use of a toll-free access number (e.g., a 1-800 access number).

After initiating such a setup telephone call, a voice response system such as voice response system 107 voices a prompt within a looping construct entering the setup call as indicated at step 3 in FIG. 2A. It is important to note that the exemplary call flows illustrated in FIGS. 2A through 2E, are directed to providing a prepaid card that has been implemented as a Santa's Helper type feature associated with the prepaid card 120. That is, a parent may give a child a special access number to call to reach what may be prompted as Santa's workshop to leave one or more Christmas wish list items and record those items in corresponding messages, for which data is stored in the SDP 106 as shown in FIG. 1. At a later time, such as during an access call or a special feature type call to retrieve pre-recorded messages related to Christmas wish lists items, a parent may access the Christmas wish list items and retrieve the same via automatic voicing from the voice response system 107 in relation to message data stored in the SDP. 106. Accordingly, remaining processing and call flow steps illustrated in FIG. 2A are directed to prompting the card user (e.g., a child, etc.) to leave one or more Christmas wish lists messages and have the same recorded in the SDP 106. Thus, steps 4, 5, 6, 7, 8, 9, 10, 11, 12, 13, 14, 15, 16, 17, 18, 19, 20, 21, 22, 23, 24, 25, and 26 are directed to allowing a card user to record at least one message in a storage facility similar or like a voice message record and playback system commonly associated with telephony systems to facilitate automatic receipt, recordation, and playback of voice messages from callers.

In particular, at step 13, an outbound connection to a voice response platform such as the voice response system 107, will be initiated to actually record wish list and/or other messages from a card user during a feature/service setup call. During such an outbound connection to a voice response platform, processing will occur as illustrated in FIG. 2B and, in particular, beginning at step 27 thereof.

Figure 2B:
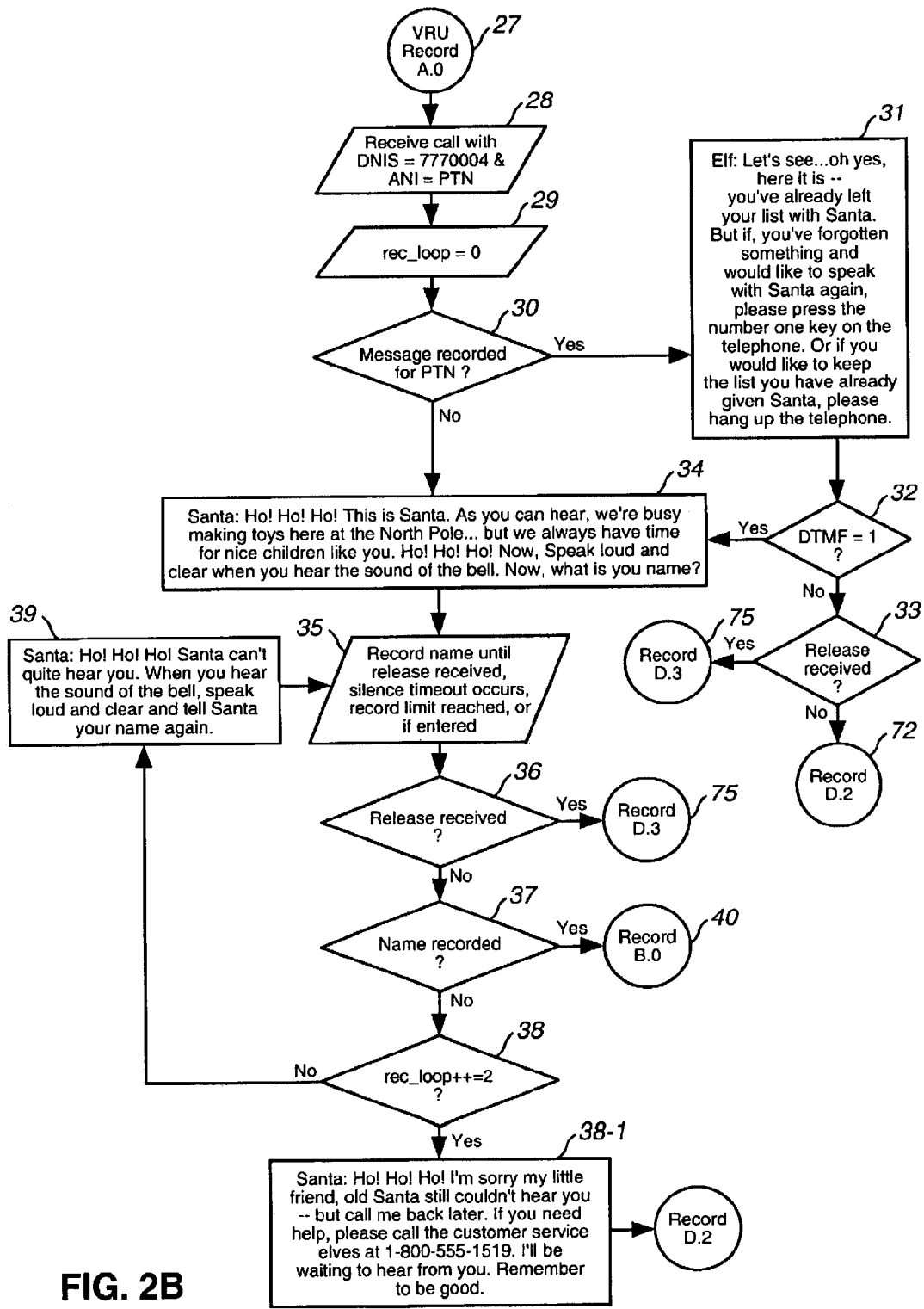
FIG. 2B is a continuation call flow diagram of the call flow diagram started in FIG. 2A.

Referring now to FIG. 2B, depicted therein are further process and call flow steps carried out, at least in part, by a voice response platform to receive a call from the prepaid calling card processing system 104 or other connection therefrom, which will include an automatic number identification (ANI) code identifier or call number identifier (automatic number identifier—e.g., the dialed digits, etc.) that has been set by prepaid calling card processing system 104 to be equal to a PIN Tracking Number (PTN) or other PIN code number associated with the prepaid card 120. It should be noted, at step 30 as illustrated in FIG. 2B, that messages may be recorded in relation to the prepaid card 120 based upon the PTN or other unique card identifier. That is, any files or data stored or caused to be stored by a voice response system handling the in-bound connection to record messages from a card user will be recorded based upon the PTN and may even include file names or key index keys related to the pin tracking number or other unique card identifier. Accordingly, processing call flow steps 28, 29, 30, 31, 32, 33, 34, 35, 36, 37, 38, 38–1, and 39 are directed to further prompting the user to record at least one message to be associated with the prepaid card 120 until such time as a release is received on the call such as one that occurs when the calling party (card user) hangs up his telephone handset. In particular, if after step 31, it is determined that the user desires to leave another message, then processing may proceed to further recordation steps as illustrated in FIG. 2E and, in particular to steps 72 and 75. In particular, as shown in FIG. 2E, call detail reports will be written within the SDP 106 based on the user's DTMF responses as illustrated in FIG. 2B. In particular, completion status will be set to either value "102" or value "103" depending on weather a release was received after the user entered a DTMF string or keypad entry of "1", for example. Such status values are not required to be any value and, as such, may be set to any multi-trait flag type variable setting to indicate status of a multi-faceted process.

Although it is preferred to use the ANI code segment/field of an ISUP or other messaging scheme, the present invention is not so limited. To the contrary, any data storage and transport vehicle, such as other fields within an ISUP message, may be used to store and transport a unique card identifier.

Figure 2C:
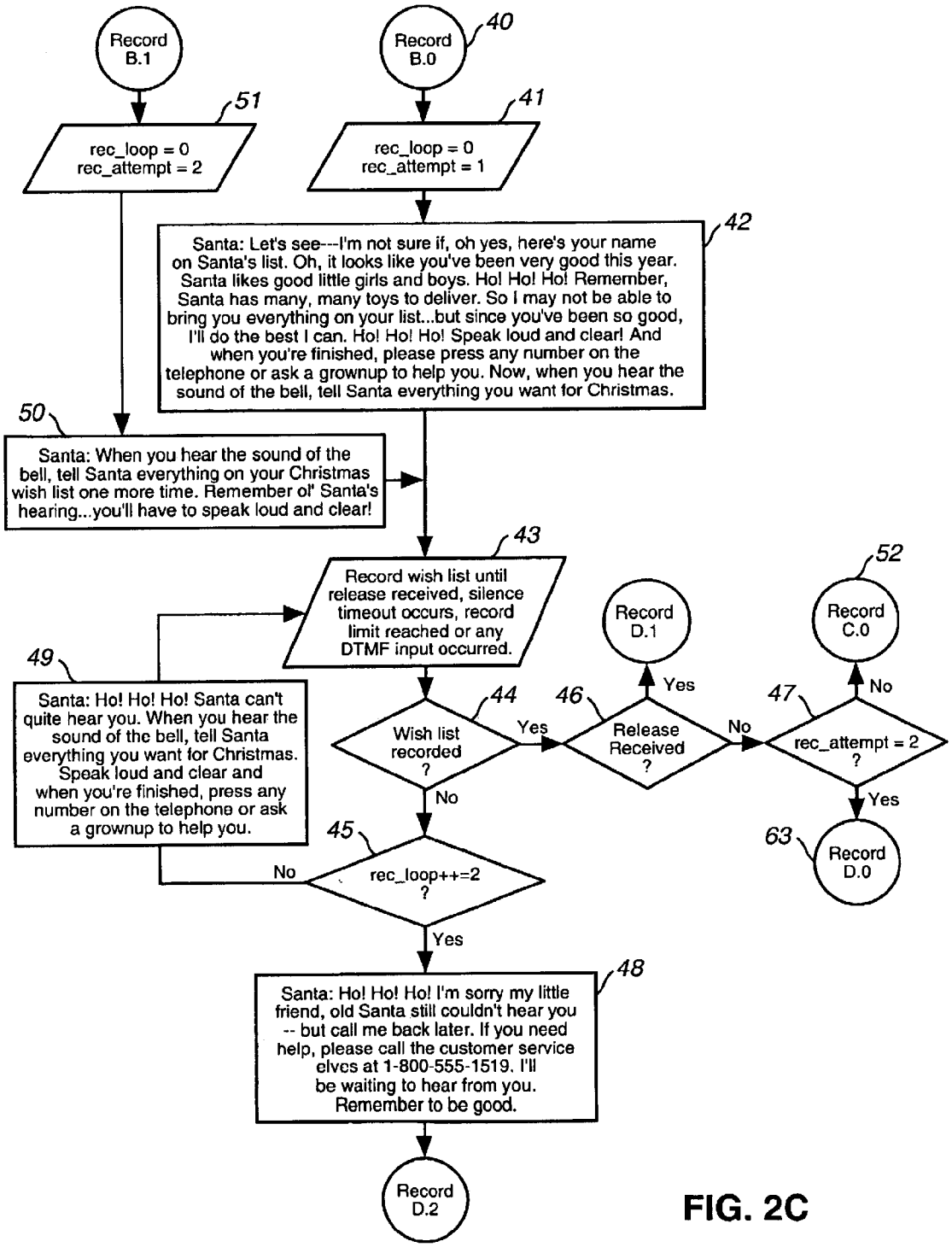
FIG. 2C is a continuation call flow diagram of the call flow diagram started in FIGS. 2A and 2B.

Additionally, if after the name was recorded as determined at step 37 in FIG. 2B, (the user's name), processing proceeds to step 40 within FIG. 2C.

Referring now to FIG. 2C, depicted therein are processing and call flow steps 40, 41, 42, 43, 44, 45, 46, 47, 48, 49, 50, and 51. In FIG. 2C, further prompting will be performed to prompt the user during the setup call. Additionally, recording of wish list items will be carried out at step 43 until either a call release is realized, a silence during the setup call time-out occurs, a record limit for recording an amount of data corresponding to messages to be recorded is reached, or if any DTMF entry occurs via a telephone key pad device. The other process steps illustrated in FIG. 2C will be readily apparent and immediately understood by those skilled in the art after reviewing the same.

Figure 2D:
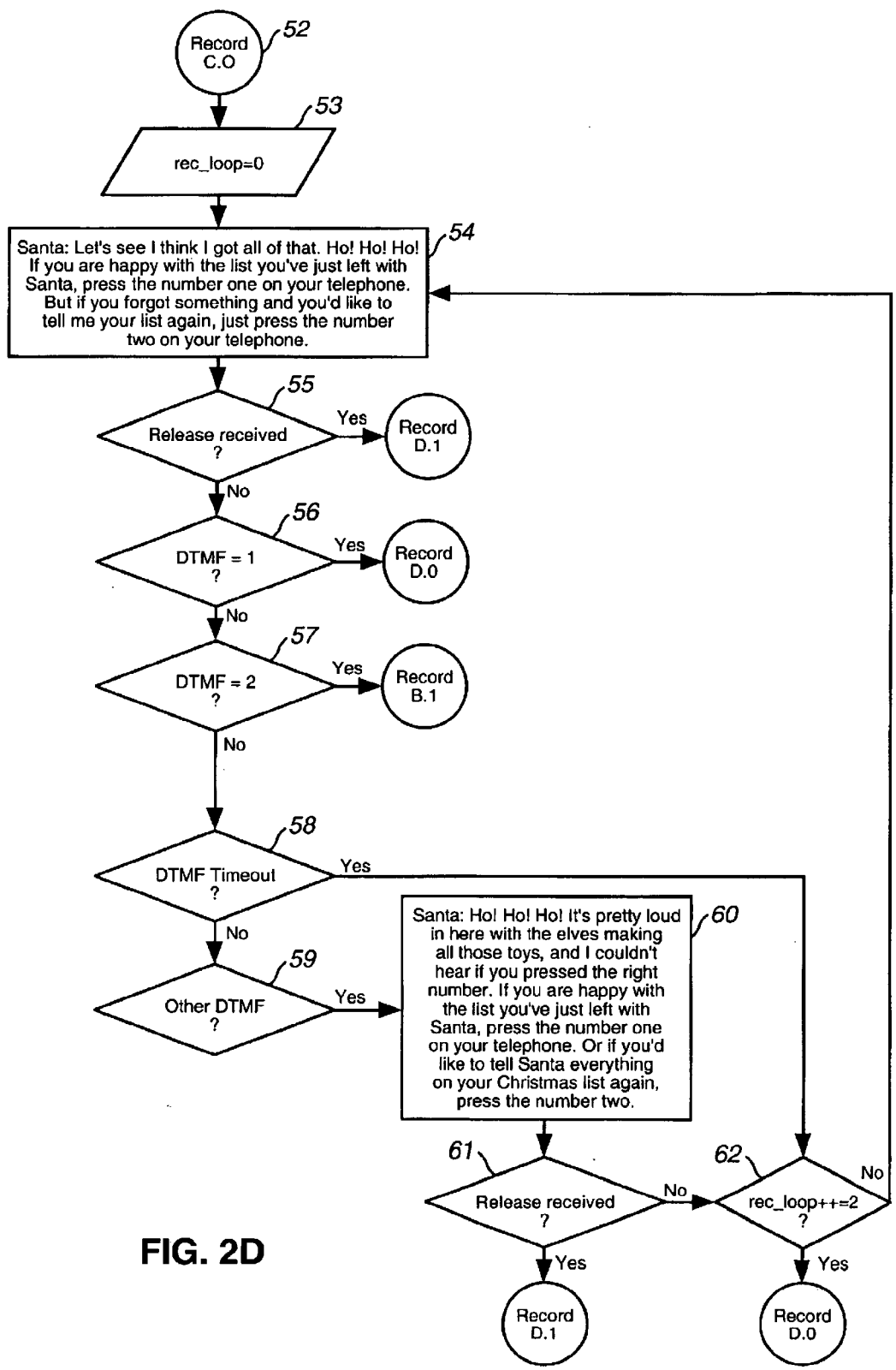
FIG. 2D is a continuation call flow diagram of the call flow diagram started in FIGS. 2A–2C.
Figure 2E:
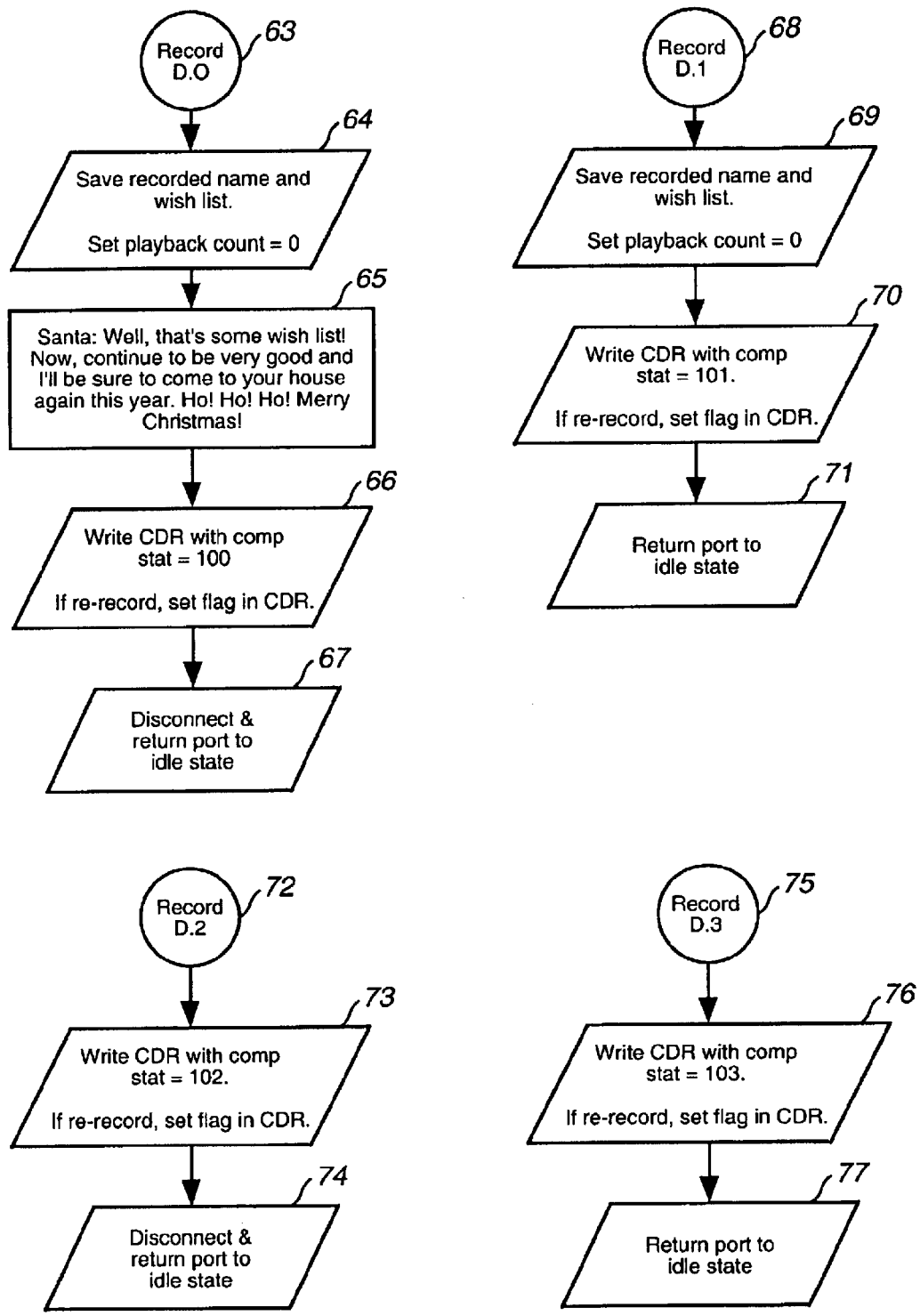
FIG. 2E is the conclusion call flow diagram of the call flow diagram started in FIGS. 2A–2D.

It should be noted, however, that at step 47 a determination will be made as to weather or not a proper record operation was attempted possibly two times. If not, processing will proceed to step 52 as illustrated in FIG. 2D. If recording did occur properly, processing will proceed to step 63 as illustrated in FIG. 2E.

Referring now to FIG. 2D, depicted therein are processing and call flow steps 52, 53, 54, 55, 56, 57, 58, 59, 60, 61, and 62. Such process and call flow steps are carried out to prompt the user to enter further and/or forgotten wish list items in accordance with the preferred embodiment of the present invention. The process steps illustrated within FIG. 2D will be immediately understood by those skilled in the art after reviewing the same.

Referring now to FIG. 2E, and in particular, the record call flows illustrated at steps 63, 64, 65, 66, and 67. Such operations are carried out to further prompt the user and to write call detail reports with completion status's set to value one-hundred (100) to indicate satisfactory completion and recording of wish list items within at least one message recorded by the user in accordance with a preferred embodiment of the present invention. Such operations will be immediately understood by those skilled in the art after reviewing the flows illustrated in FIG. 2E.

The aforementioned discussions relating to prepaid card setup in accordance with the present invention as exemplified in FIGS. 2A–2E, involved card activation (e.g., at a point-of-sale station via a point-of-sale (POS) controller system, etc.) and setup by the user. After the user records such a message(s), the same may be manifested (voiced, etc.) to another card user. For example, a child may record a Christmas wish list message to be stored in relation to a prepaid card, which may be played back and heard later by a parent.

Figure 3A:
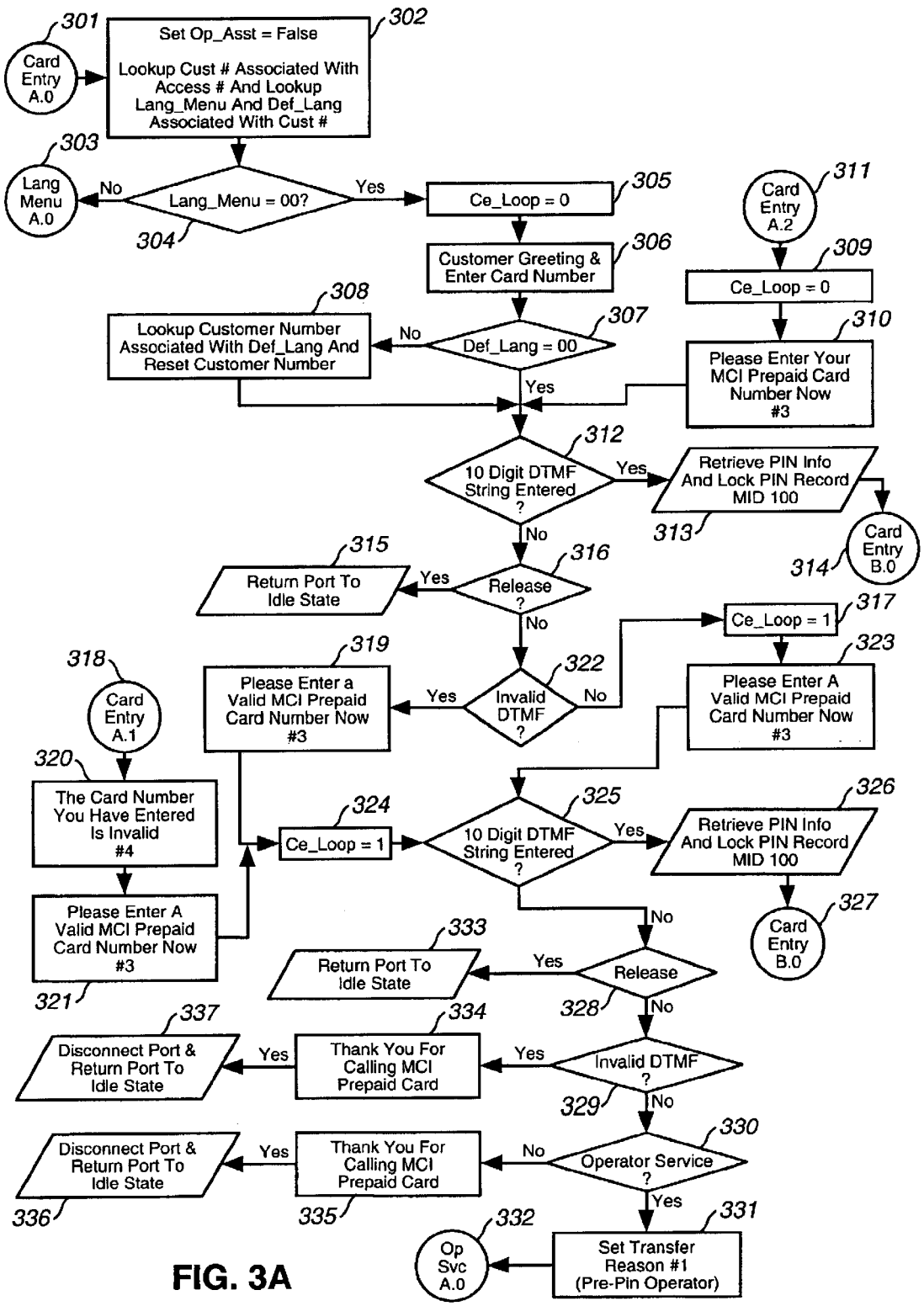
FIG. 3A is a call flow diagram that illustrates the operations carried out within the system depicted in FIG. 1 to allow use of a prepaid telephone calling card and, in particular, one having a message recording capability in accordance with a preferred embodiment of the present invention.

The operations carried out within the system 100, FIG. 1, to facilitate such prepaid card use by the user are illustrated in the call flow diagrams shown in FIGS. 3A–3O.

Referring now to FIG. 3A, depicted therein is a call flow diagram related to the use of the prepaid card 120. FIG. 3A includes steps 301–332. The process steps depicted in steps 3A are self-explanatory and, accordingly, are discussed herein in summary. A calling party (e.g., the user) dials a prepaid card access number (e.g., a 1-800 access number) to access the prepaid calling card processing system 104 via the PSTN 102. Based on the access number, the calling party accesses the prepaid calling card system 104 at step 302, an appropriate language menu at step 303 may need to be provided to the calling party (e.g., for callers in foreign countries for example). Otherwise, if the calling party is dialing an access number that corresponds to a domestic access number, then processing proceeds as otherwise indicated in FIG. 3A and the calling party will be prompted with the various prompts illustrated therein and, in particular, to enter a card/PIN number/identifier associated with his prepaid card, etc.

Figure 3B:
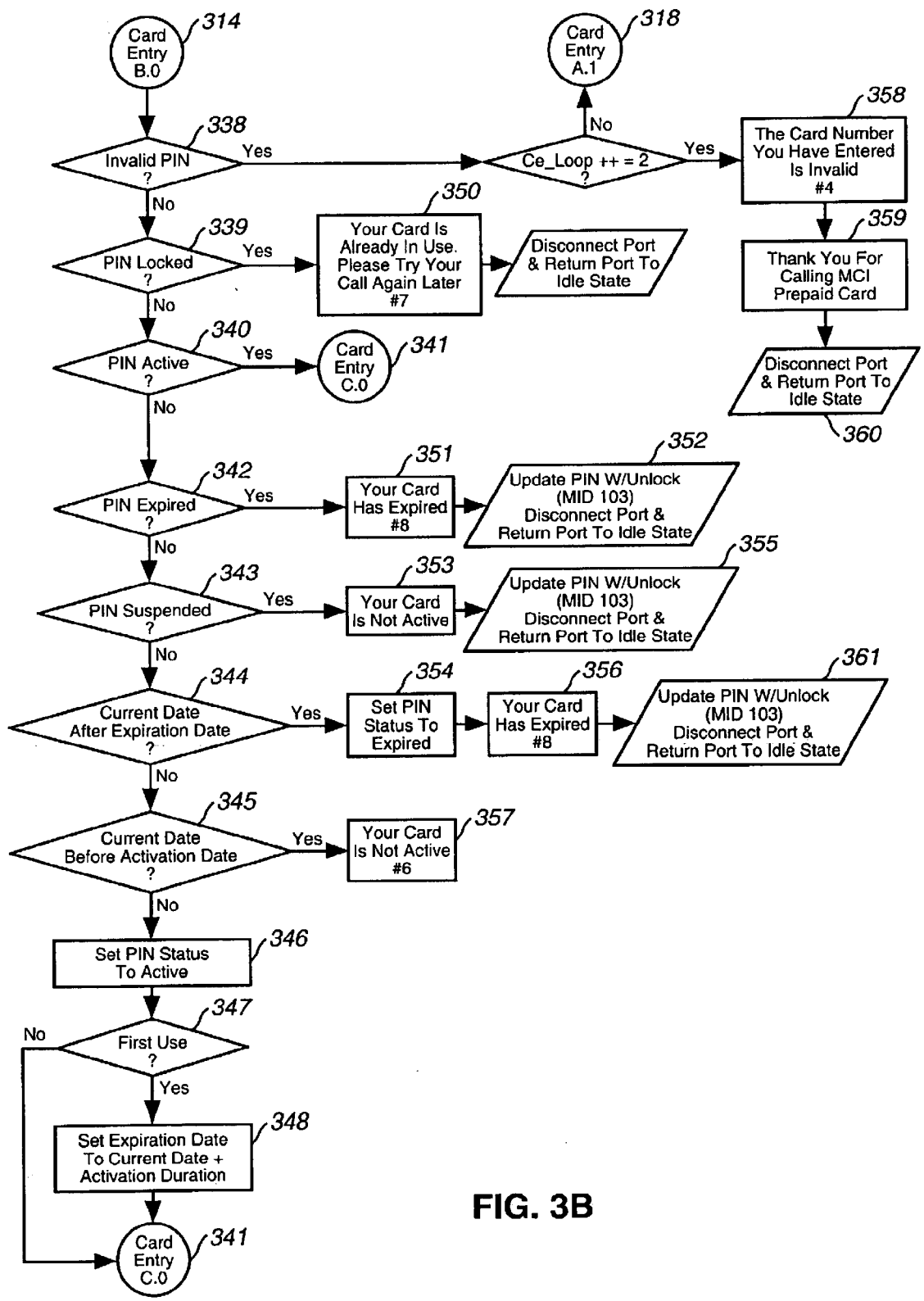
FIG. 3B is a continuation call flow diagram of the call flow diagram started in FIG. 3A.
Figure 3C:
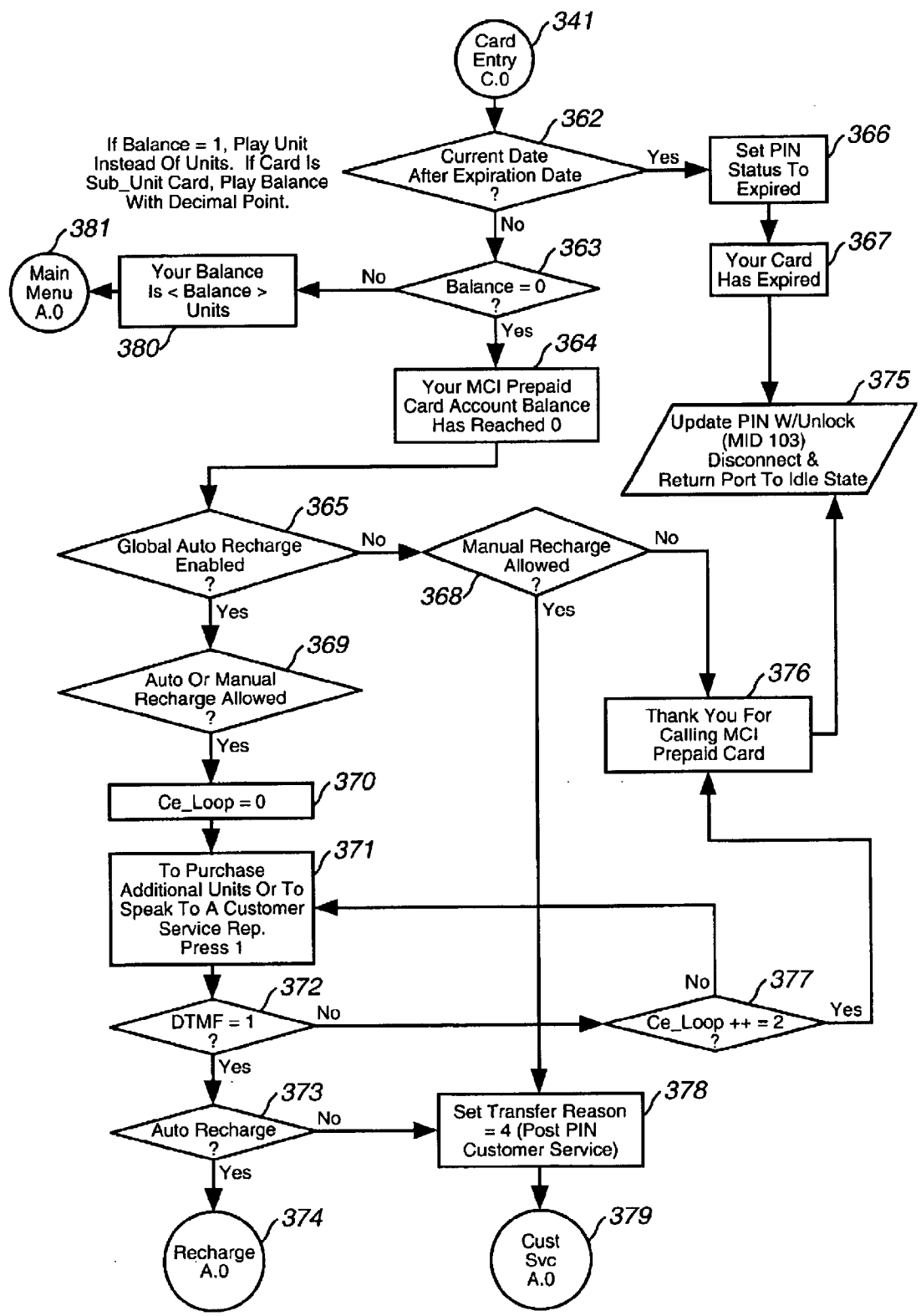
FIG. 3C is a continuation call flow diagram of the call flow diagram started in FIGS. 3A and 3B.
Figure 3D:
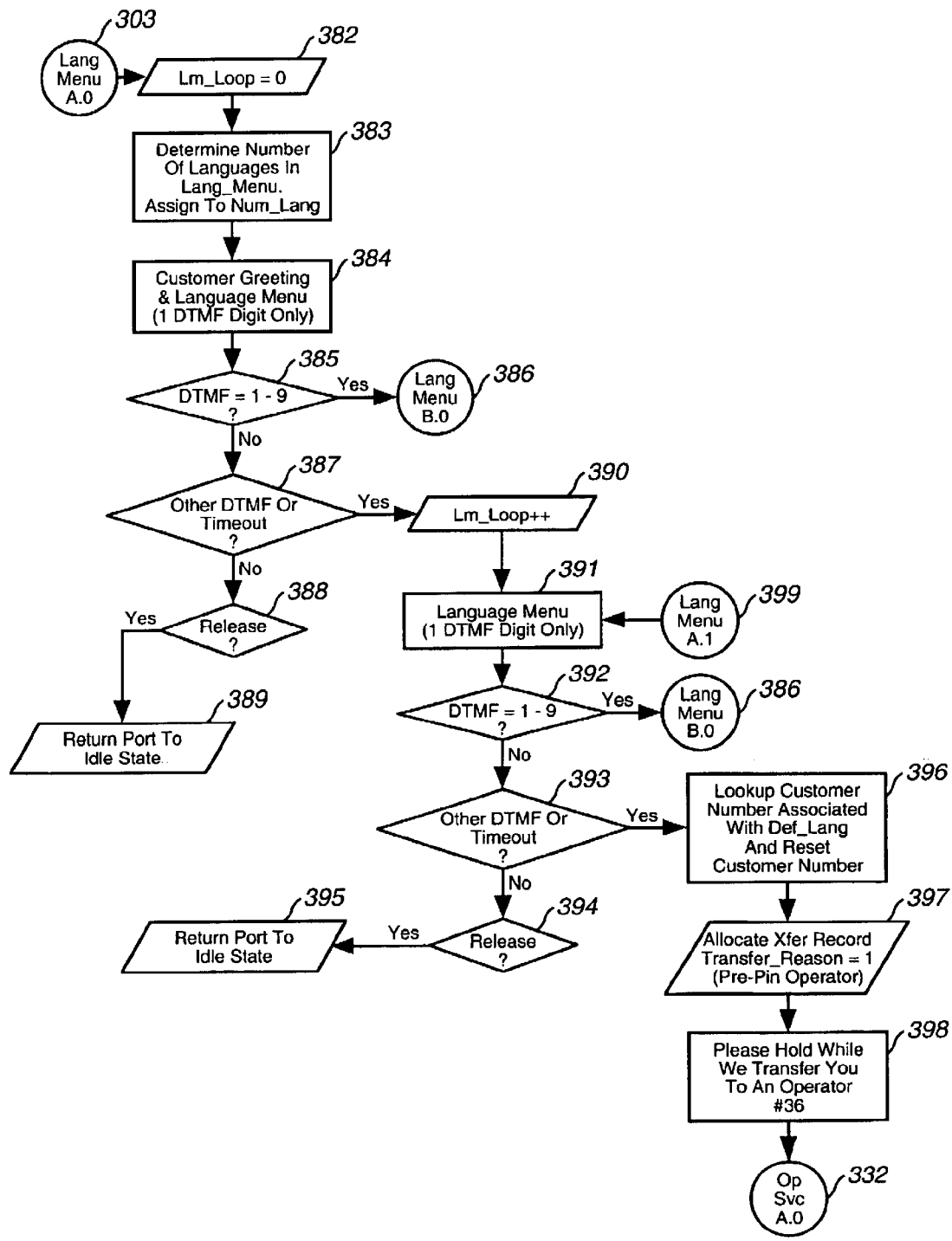
FIG. 3D is a continuation call flow diagram of the call flow diagram started in FIGS. 3A–3C.
Figure 3E:
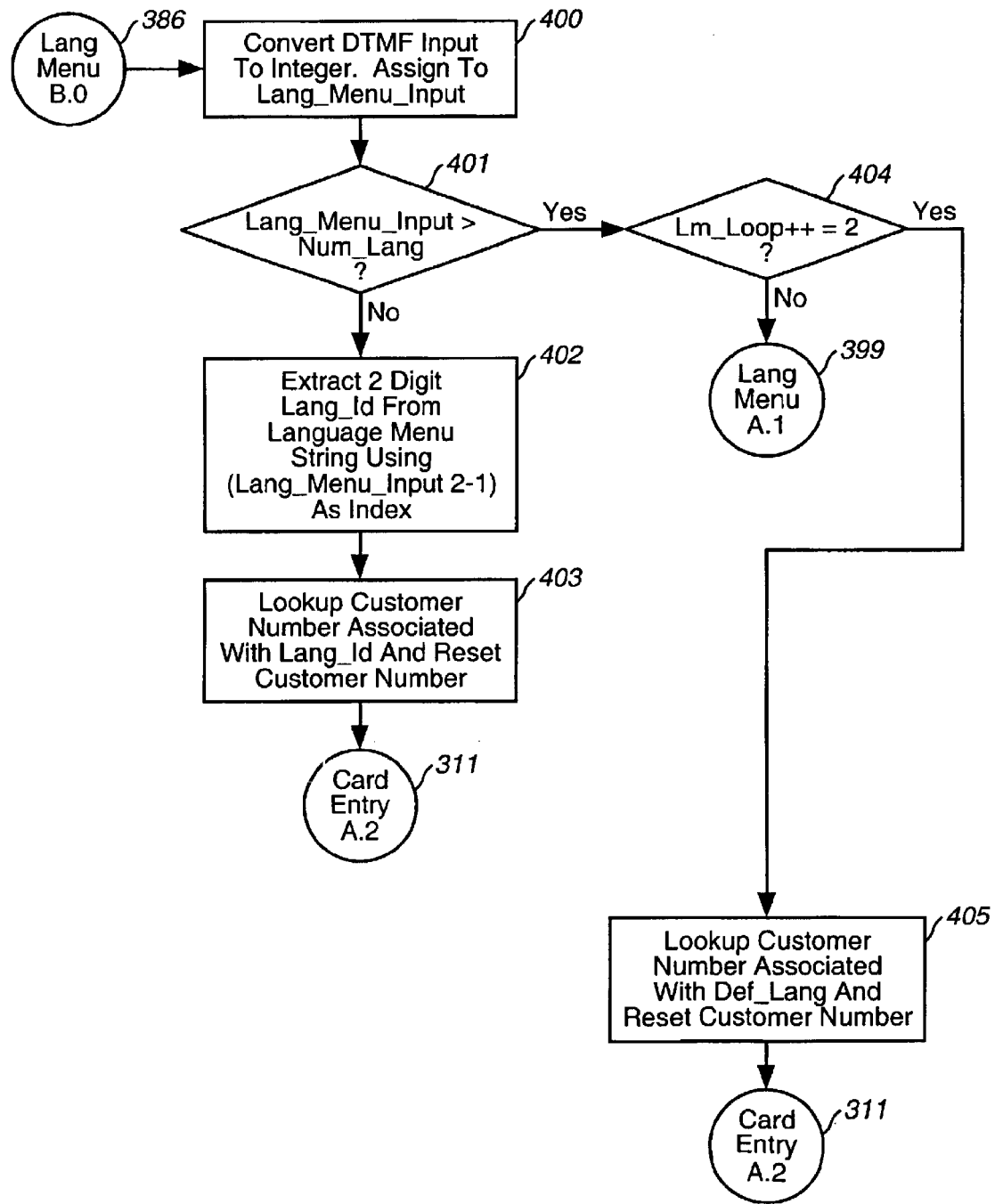
FIG. 3E is a continuation call flow diagram of the call flow diagram started in FIGS. 3A–3D.

If, at step 304, an alternative language is to be used to prompt a calling party in relation to his prepaid card, processing will proceed to step 303 at the top of FIG. 3D and, in particular, to the steps within FIGS. 3D and 3E. FIGS. 3D and 3E include process steps 382–405 and are intended to illustrate exemplary operations to allow a calling party to select a particular language by which the prepaid telephone calling card processing system 104 will manifest audible voice prompts to the calling party (e.g., French prompts to a French-speaking card user, etc). Those skilled in the art will immediately understand the process steps illustrated in FIGS. 3D and 3E. It should be noted, however, that there are references to operator services within FIG. 3D that are illustrated within FIG. 3F as discussed below.

After the calling party is prompted to enter his prepaid card number (e.g., a 10 digit DTMF PIN code/card identifier associated with his prepaid calling card), processing will proceed at the top of FIG. 3B to verify the card number (PIN code associated with the prepaid card) and to allow further processing as indicated in FIG. 3B.

Figure 3F:
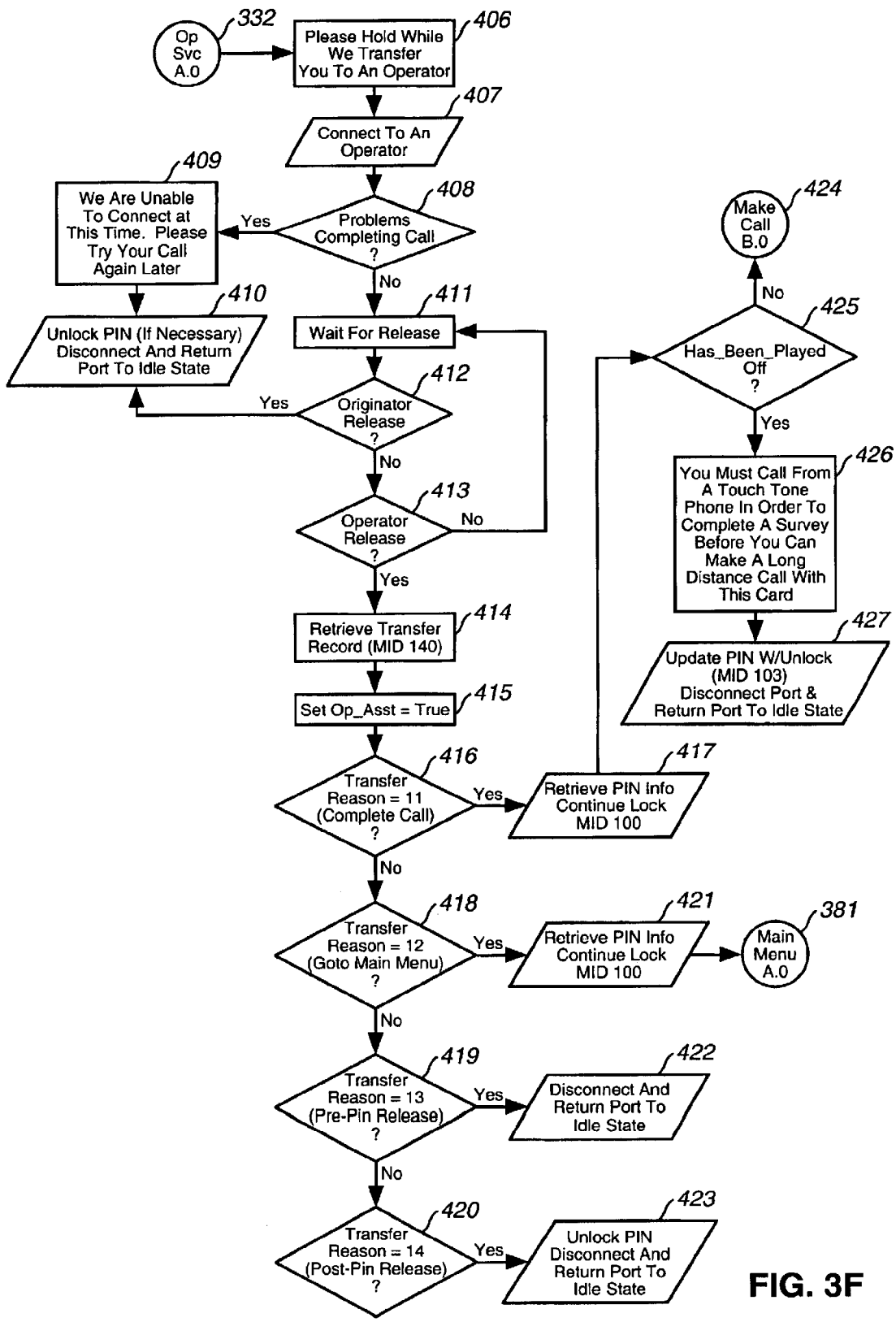
FIG. 3F is a continuation call flow diagram of the call flow diagram started in FIGS. 3A–3E.

If the ten digit DTMF string of digits entered by the calling party is an invalid string (e.g., one containing only symbols such as multiple "*" and "#" entered via a telephone key pad) and a release did not occur on the telephone call into the prepaid calling card processing system 104, operator service may be automatically initiated at step 331 and processing will then proceed at step 332 at the top of FIG. 3F. In FIG. 3F, process steps 406–427 are illustrated to exemplify operator assistance to a caller who has not entered an appropriate DTMF sequence that can correspond to a card number or PIN code associated with a prepaid card as stored in SDP 106 (FIG. 1).

Depicted in FIG. 3B are process and call flow steps 314, 318, and 338–361. Such process and call flow steps are self-explanatory and accordingly, are discussed herein in summary. In FIG. 3B, the ten-digit PIN code entered by the calling party (also referred to above as the card number/identifier) are verified in relation to PIN data stored in SDP 106 as shown in FIG. 1. If the PIN code is an active PIN code indicating that the prepaid calling card is valid and usable (although minutes/units may be depleted), then processing proceeds to step 341 at the top of FIG. 3C. It should be noted that although it is preferred to use a 10 digit PIN type code to identify a particular prepaid card, the present invention is not so limited. Instead, any type of card identifier or PIN of any length that suits particular design requirements to uniquely identify a particular prepaid card may be used in accordance with the present invention.

In FIG. 3C, process steps 362–381 are carried out to further validate the calling party's prepaid card (e.g., prepaid card 120). Additionally, the amount of remaining minutes left on the calling party's prepaid card 120 will be analyzed at step 363 and the calling party will be correspondingly notified as to the balance at steps 364 and 380, respectively. If prepaid card 120 contains remaining units (e.g., minutes of long distance telephone service, etc.), processing will proceed at the top of FIG. 3H and, in particular, at step 381 therein.

Figure 3G:
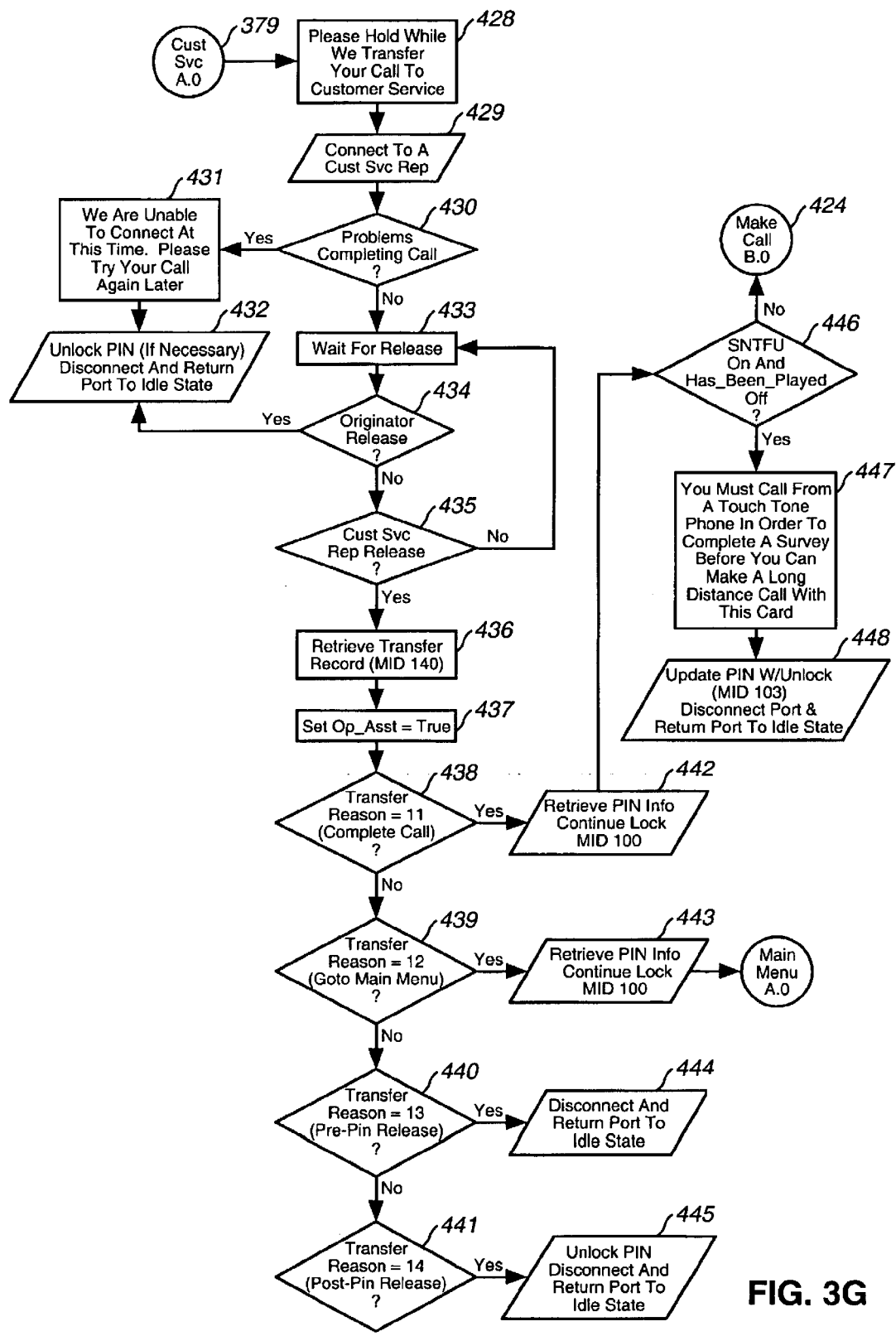
FIG. 3G is a continuation call flow diagram of the call flow diagram started in FIGS. 3A–3F.

It is important to note that the present invention will accommodate recharging and, in particular, recharge activation operations to cause an additional number of calling units to be associated with a particular prepaid card, etc. Accordingly, if at step 364 the calling party is prompted that his prepaid card has a zero unit balance, processing may proceed to step 368, and to step 378 to reach customer service at step 379 as indicated at the top of FIG. 3G. In FIG. 3G, process steps 428–448 illustrate the sequence of operations that may be carried out to have a live operator manually recharge the calling party's prepaid card. Such recharge operations are, in actuality, database operations to adjust remaining unit counts in the SDP 106 (FIG. 1), which correspond to the prepaid card 120. A discussion of such recharge operations may be found in co-pending U.S. patent application Ser. No. 09/089,815, filed on Jun. 4, 1998, entitled "POINT OF SALE ACTIVATION AND DEACTIVATION OF PREPAID TELEPHONE CALLING CARDS," which is commonly assigned and incorporated herein by reference.

Figure 3H:
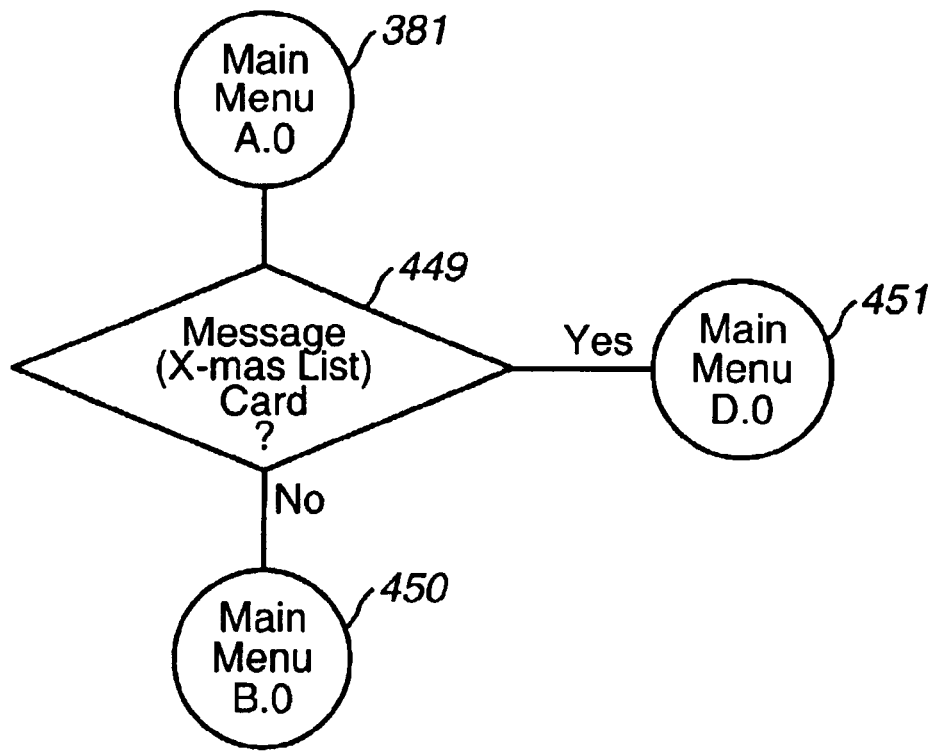
FIG. 3H is a continuation call flow diagram of the call flow diagram started in FIGS. 3A–3G.
Figure 31:
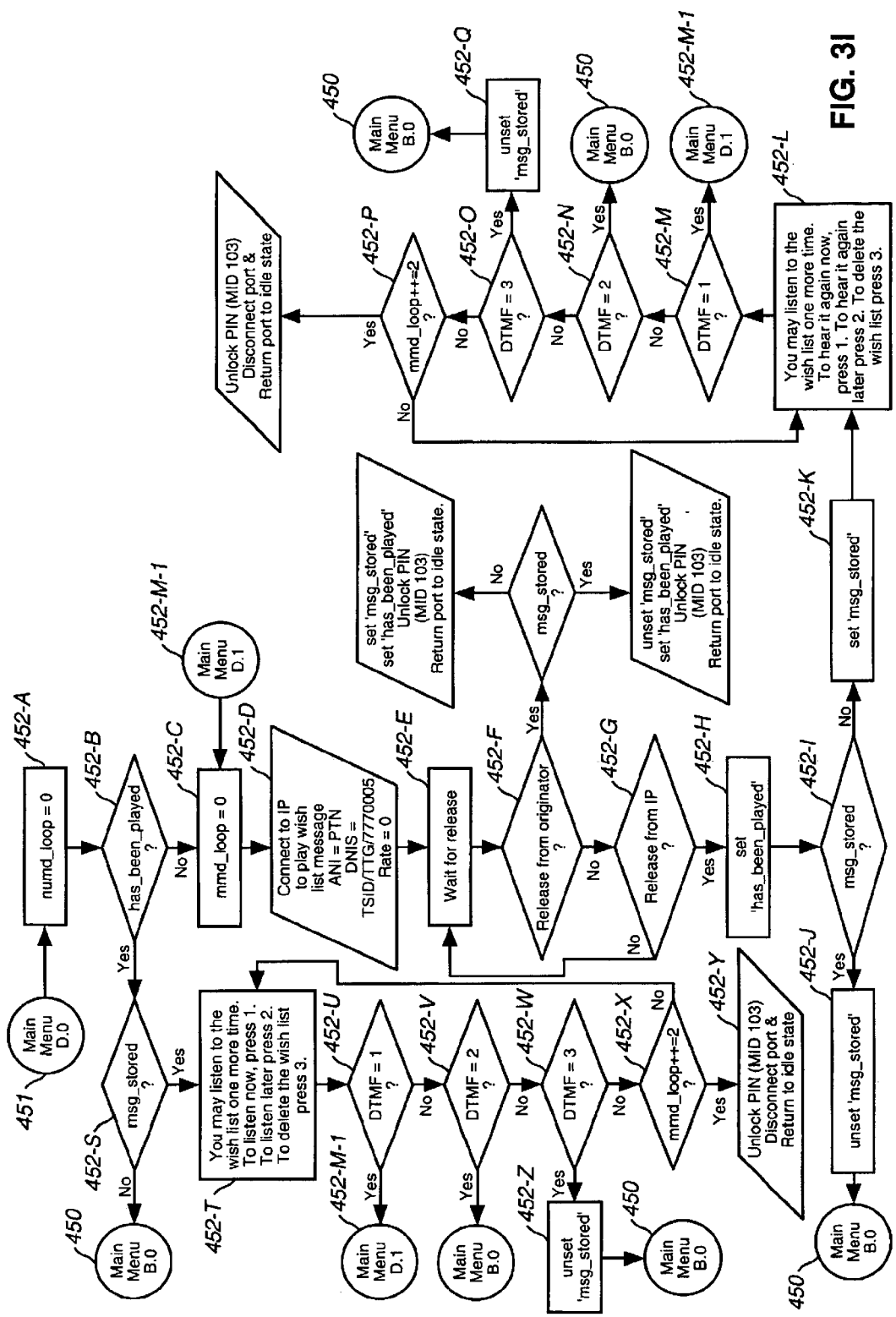

Referring now to FIG. 3H, depicted therein is a decisional call flow diagram related to determining weather the prepaid card 120 is a message type card that is provided in accordance with the present invention. If the prepaid card 120 is a message type card, then processing proceeds to step 451 at the top of FIG. 3I. If not, processing proceeds to step 450 at the top of FIG. 3K.

Figure 3J:
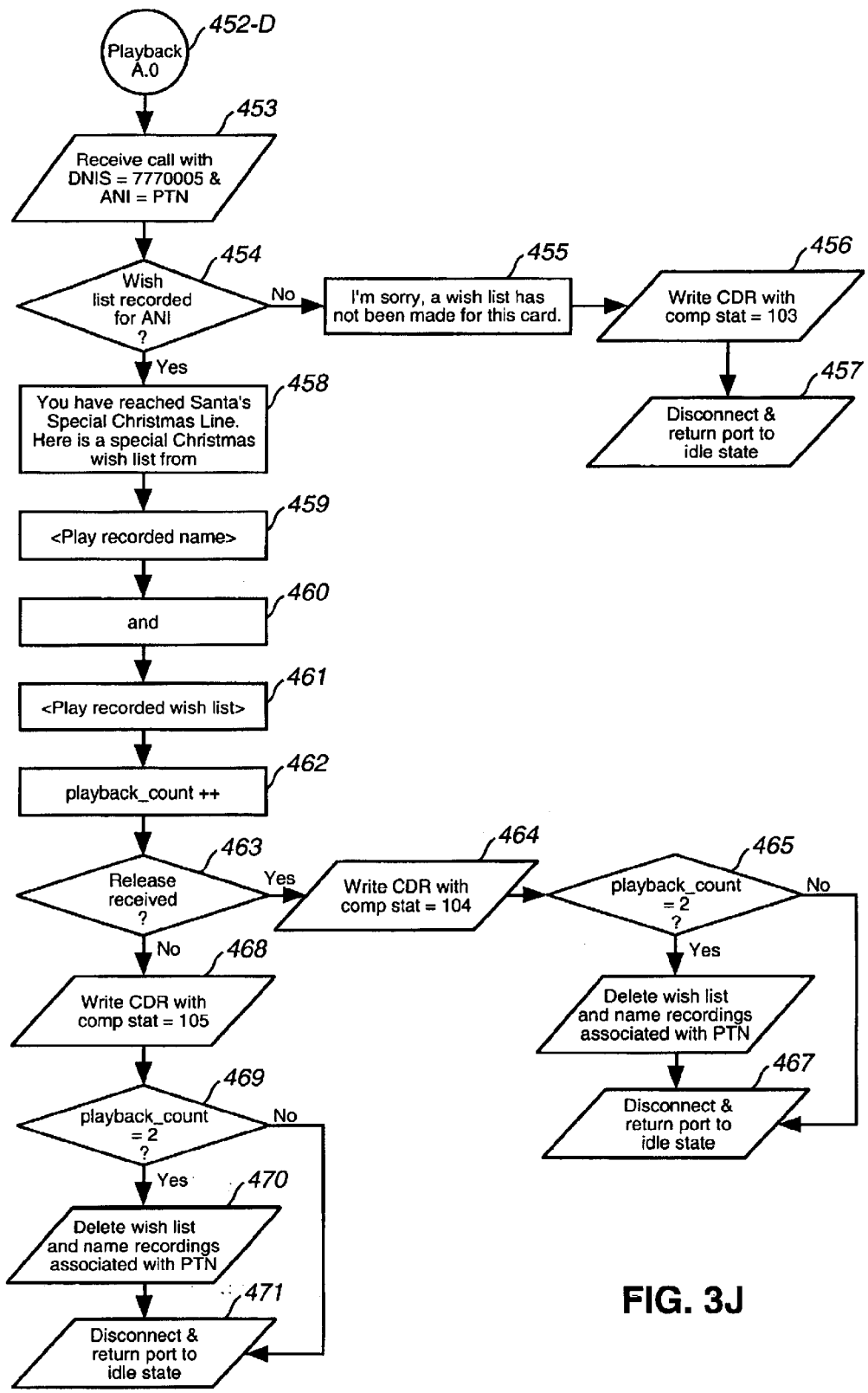
FIG. 3J is a continuation call flow diagram of the call flow diagram started in FIGS. 3A–3I.

Referring now to FIG. 3I, depicted therein is a call flow sequence for determining whether at least one pre-recorded message associated with the prepaid card 120 has been played by the prepaid telephone calling card processing system 104 during an earlier prepaid card usage session initiated by a card user. If pre-recorded messages have not been played, as determined at step 452-B, then processing will proceed to step 452-C and D where the prepaid telephone calling card processing 104 will connect to the voice response system 107 to play pre-recorded messages (e.g., such as Christmas wish list items) that have been pre-recorded by a card user such as a child. In launching such a process, the ANI on that launched call/session will be setup to be equal to the PTN/PIN or card identifier associated with the prepaid card 120 as stored in SDP 106 in relation to one or more data records for prepaid card 120. Accordingly, automatic play-back of pre-recorded messages will occur beginning at step 452-D as indicated at the top of FIG. 3J via voice response system 107 or other voice response platform. FIG. 3J includes process steps 452-D, 453–471 that illustrate the automatic playback or manifesting of pre-recorded messages during a telephone call (e.g., during an access or message retrieval call) initiated by a calling party in relation to prepaid card 120. In particular, at step 461, pre-recorded messages associated with a file name that was set to be equal to the ANI code will be played via the telephone call session to the prepaid calling card processing system 104 from the calling party (card user). At steps 463–471, the voice response system 107 will write appropriate call detail report records with completion status indicating 1 (for played, for example), will delete the messages with the file name equal to the ANI code received from the voice response system 107, and will disconnect and return call ports to an idle state. Processing will return back to the steps illustrated in FIG. 3I.

The operations illustrated within FIG. 3I will be immediately understood by those skilled in the art after reviewing the same as discussed herein.

Figure 3K:
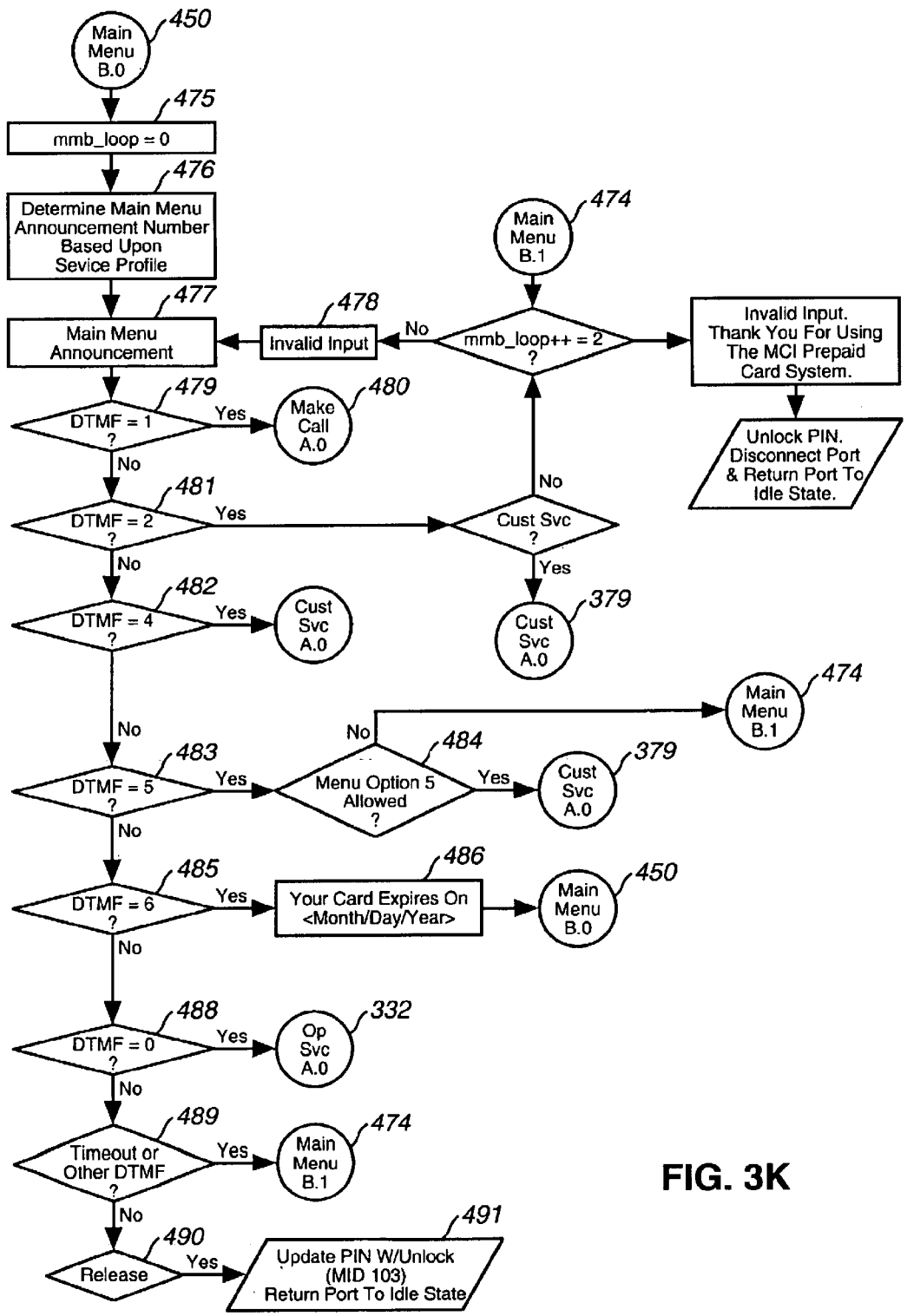
FIG. 3K is a continuation call flow diagram of the call flow diagram started in FIGS. 3A–3J.
Figure 3L:
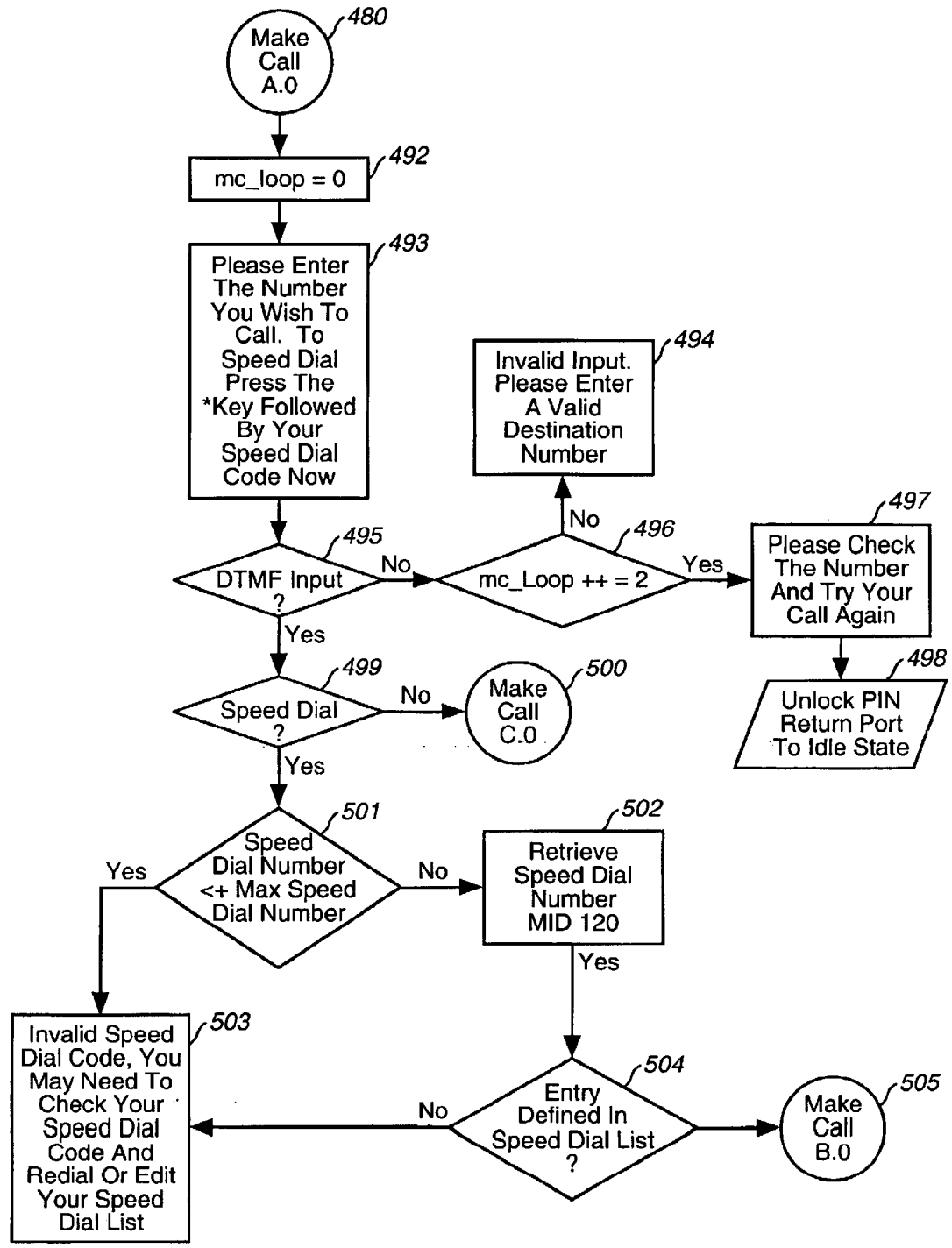
FIG. 3L is a continuation call flow diagram of the call flow diagram started in FIGS. 3A–3K.

Referring now to FIG. 3K, depicted therein is a call flow diagram that includes process steps 475–491 for prompting the user with a main menu including announcements allowing corresponding DTMF entries to occur to either access a customer service or place a call (e.g., a long distance telephone call, etc.) in accordance with the remaining call units (e.g., minutes, etc.) related to the prepaid card 120 as stored in SDP 106, for example. At step 477, a main menu is voiced to the calling party (card user). If the calling party elects to make a call, as indicated by pressing the "1" key on his DTMF telephone keypad, processing proceeds to step 480 as illustrated at the top of FIG. 3L. The remaining steps within FIG. 3K are self-explanatory and have been addressed with regard to FIGS. 3A–3J.

Figure 3M:
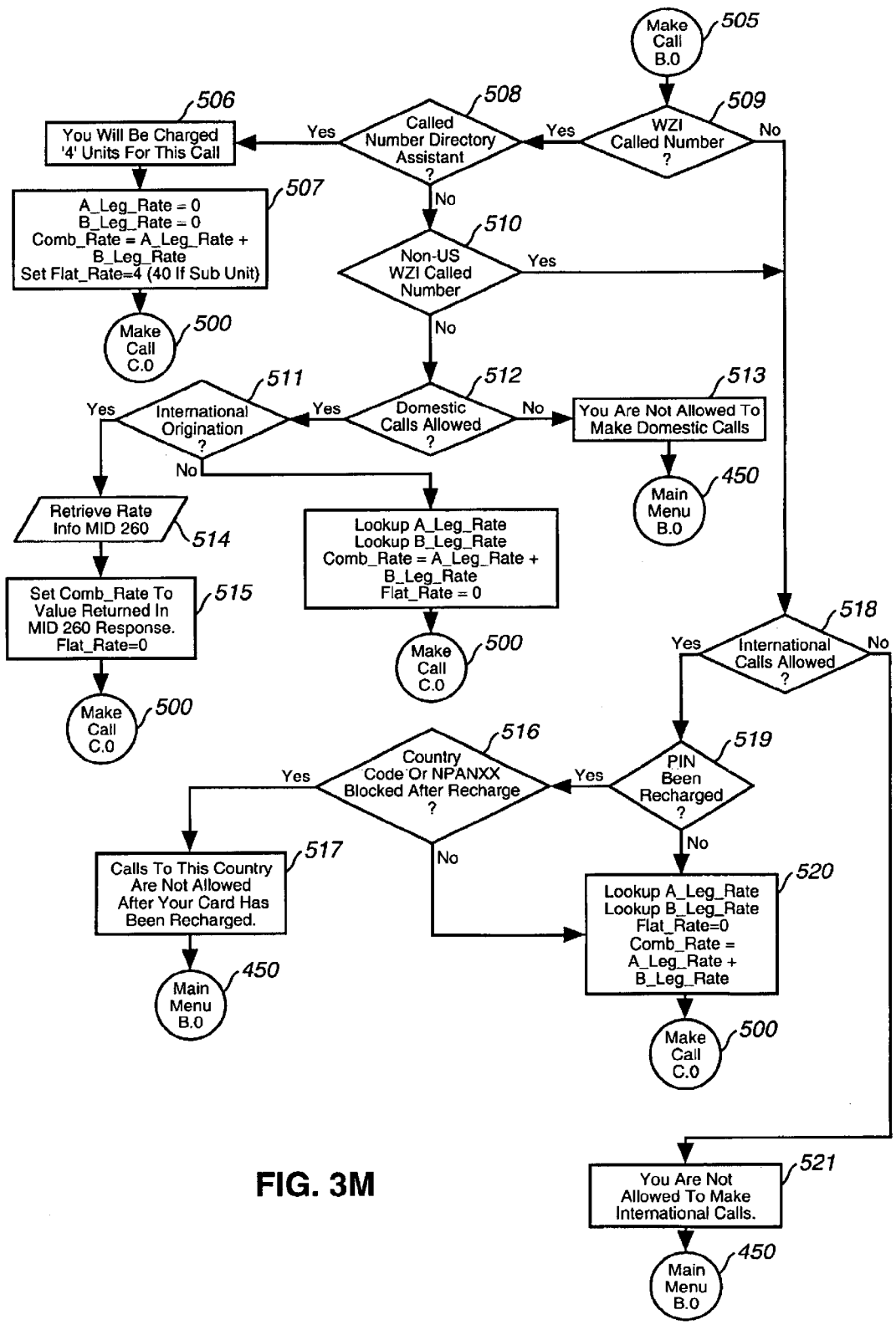
FIG. 3M is a continuation call flow diagram of the call flow diagram started in FIGS. 3A–3L.
Figure 3N:
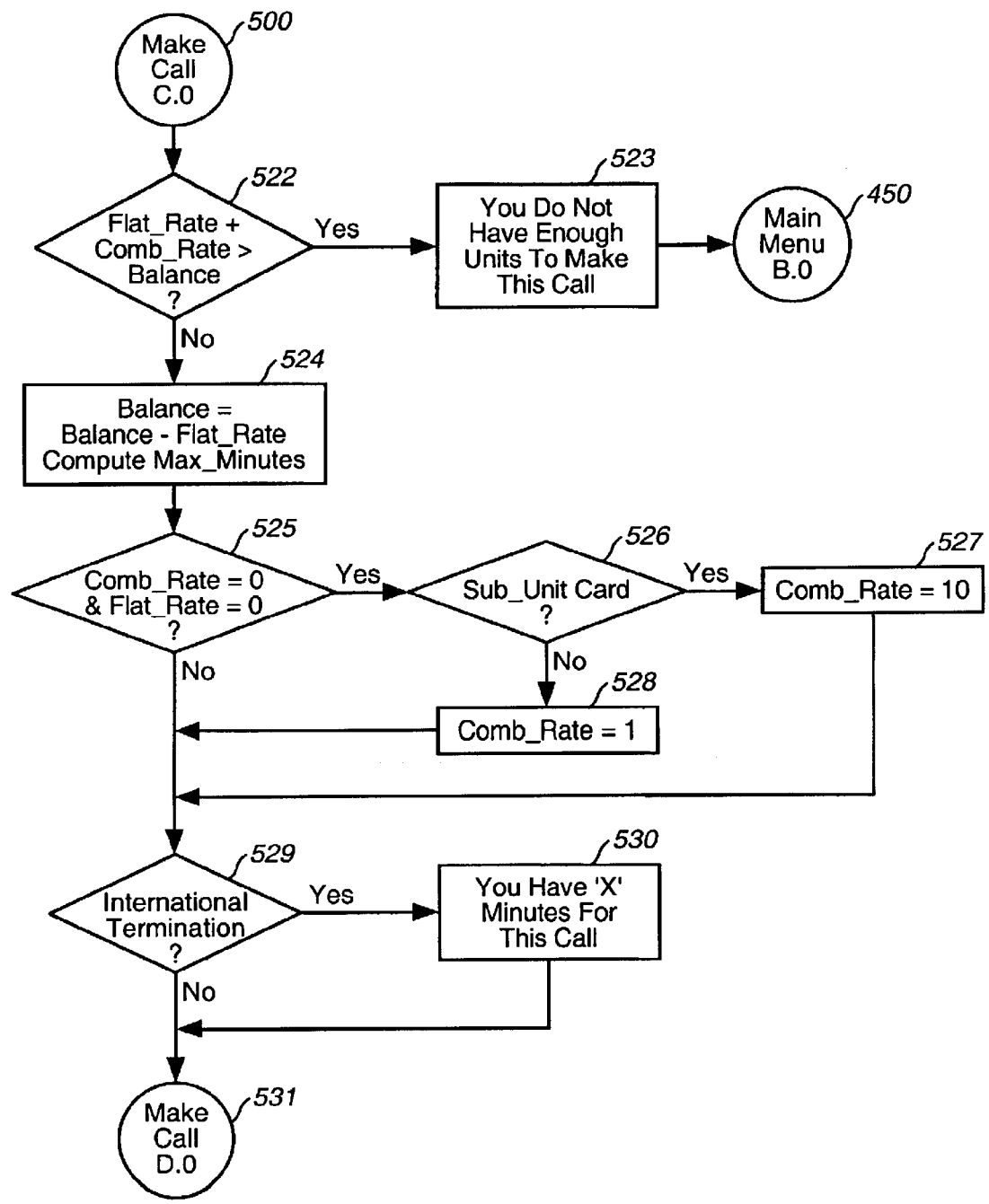
FIG. 3N is a continuation call flow diagram of the call flow diagram started in FIGS. 3A–3M.
Figure 30:
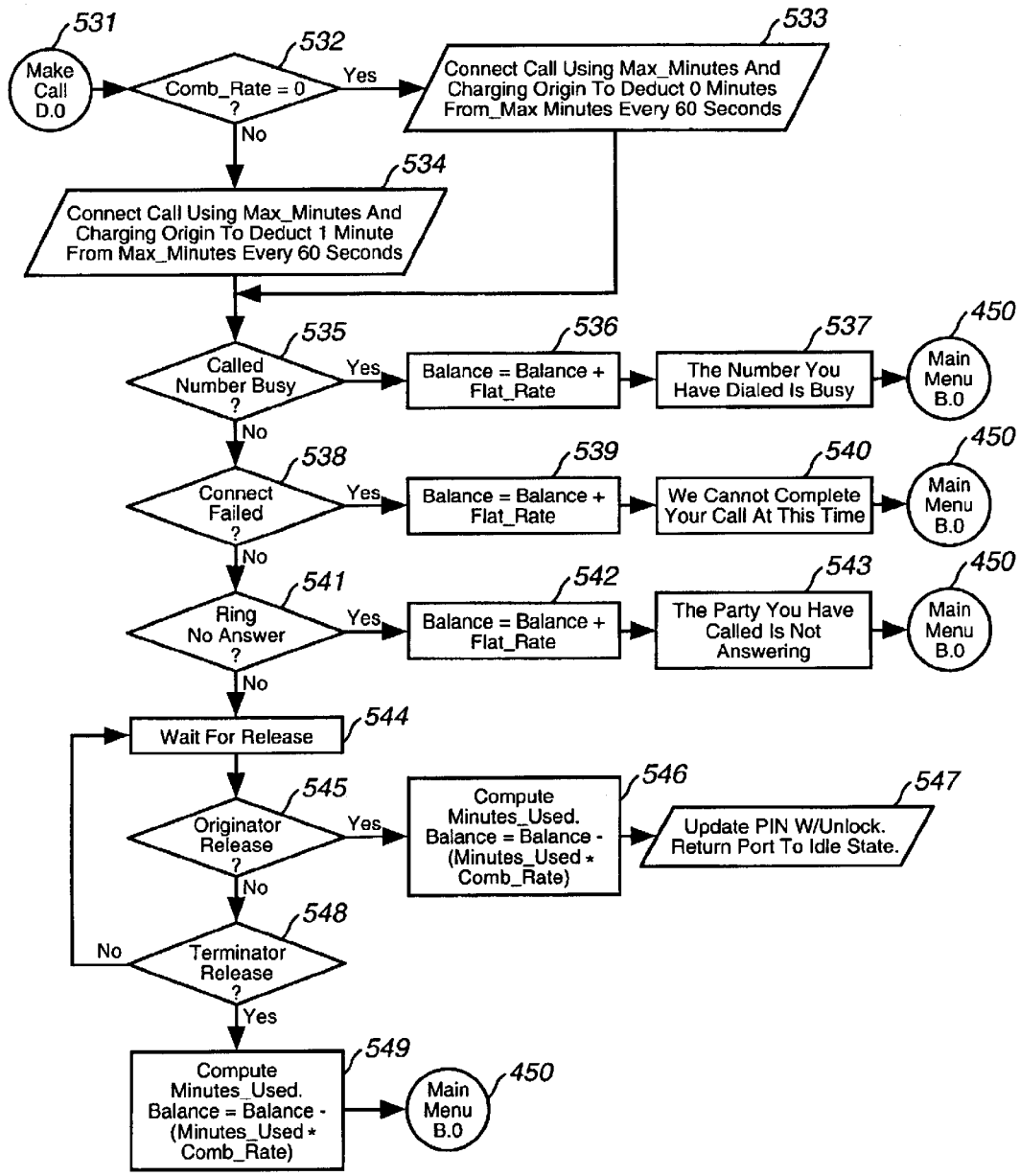

Referring now to FIG. 3L, depicted therein is the start of a call flow that will allow a calling party (card user) to initiate an outbound call in relation to his prepaid card 120. The call flow is further illustrated in FIGS. 3M–3O that include process steps 500–549, which steps will be immediately apparent and understood by those skilled and knowledgeable in the art of prepaid cards, after careful review of the process steps depicted therein.

Thus, having fully described the present invention by way of example with reference to attached drawing figures, it will be readily appreciated that many changes and modifications may be made to the invention and to any of the exemplary embodiments shown and/or described herein without departing from the spirit or scope of the invention, which is defined in the appended claims.

What is claimed is:

1. A method for recording at least one message associated with a prepaid telephone calling card, comprising:
   storing data corresponding to the prepaid telephone calling card and the at least one message;
   receiving, over a telephone network, a prepaid telephone calling card access code during a service setup call;
   determining, based on the received access code, whether the prepaid telephone calling card comprises a first type of card;
   if the prepaid telephone calling card comprises the first type of card, initiating the recording of the at least one message during the service setup call; and
   if the prepaid telephone calling card does not comprise the first type of card, directing a caller associated with the service setup call to call a first telephone number.

2. The method according to claim 1, wherein said data corresponding to the prepaid telephone calling card includes a quantity corresponding to a number of service units available to be used to make at least one call in relation to the prepaid telephone calling card.

3. The method according to claim 2, wherein said service units correspond to telephone call service minutes.

4. The method according to claim 1, wherein the at least one message is recorded in accordance with a card identifier corresponding to the prepaid telephone calling card.

5. The method according to claim 1, further comprising: automatically playing back the at least one message during an access call related to the prepaid telephone calling card.

6. A method for facilitating the use of a prepaid telephone calling card, comprising:
   receiving a call access request, associated with the prepaid telephone calling card, over a telephone network;
   determining if the prepaid telephone calling card is an audio message type calling card;
   initiating playback of the at least one audio message affiliated with the prepaid telephone calling card if the prepaid telephone calling card comprises an audio message type calling card; and
   initiating a call in response to the call access request if the prepaid telephone calling card does not comprise an audio message type calling card.

7. A method for facilitating the use of a prepaid telephone calling card, comprising:
   receiving a call access request, associated with the prepaid telephone calling card, over a telephone network;
   determining if at least one audio message affiliated with the prepaid telephone calling card has previously been stored;
   initiating playback of the at least one audio message if the at least one audio message has previously been stored; and
   initiating playback of an audio message unaffiliated with the prepaid telephone calling card if the at least one audio message has not previously been stored.

8. A system for facilitating the use of a prepaid telephone calling card, comprising:
   a data storage system configured to store data corresponding to the prepaid telephone calling card and to store at least one message related to the prepaid telephone calling card; and
   a prepaid telephone calling card processing system coupled to said data storage system and configured to:
      receive a request to play the at least one message stored in relation to the prepaid telephone calling card during an access call over a telephone network,
      initiate the playback of the at least one message during the access call,
      determine a number of times the at least one message has been played back, and
      delete the at least one message from the data storage system responsive to the determination of the number of times the at least one message has been played back.

9. A method for recording purchase preferences of an individual associated with a prepaid telephone calling card, comprising:
   receiving, over a telephone network, an access code associated with the prepaid telephone calling card;
   requesting purchase preference information of the individual;
   receiving audio data related to the purchase preference information; and
   recording the audio data as an audio message for playback during an access call related to the use of the prepaid telephone calling card.

10. A method relating to the purchase preferences of an individual associated with a prepaid telephone calling card, comprising:
   storing data corresponding to the prepaid telephone calling card and at least one audio message related to purchase preferences of the individual associated with the prepaid telephone calling card;
   receiving, over a telephone network, a request to play the at least one audio message during an access call; and
   initiating playback of the at least one audio message during the access call.

* * * * *